(12) United States Patent
Liu et al.

(10) Patent No.: US 11,382,135 B2
(45) Date of Patent: Jul. 5, 2022

(54) CONFIGURING DIFFERENT TYPES OF RANDOM RESOURCES

(71) Applicant: Huawei Technologies Co., Ltd., Shenzhen (CN)

(72) Inventors: Kunpeng Liu, Beijing (CN); Bingyu Qu, Beijing (CN); Jianqin Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/272,705

(22) Filed: Feb. 11, 2019

(65) Prior Publication Data
US 2019/0174551 A1 Jun. 6, 2019

Related U.S. Application Data

(63) Continuation of application No. PCT/CN2017/097247, filed on Aug. 11, 2017.

(30) Foreign Application Priority Data

Aug. 12, 2016 (CN) .......................... 2016 1 0670239
Nov. 4, 2016 (CN) .......................... 2016 1 0978462

(51) Int. Cl.
*H04W 74/08* (2009.01)
*H04L 5/00* (2006.01)
(Continued)

(52) U.S. Cl.
CPC ....... *H04W 74/0833* (2013.01); *H04L 5/0048* (2013.01); *H04L 5/0053* (2013.01);
(Continued)

(58) Field of Classification Search
CPC ......... H04W 74/0833; H04W 72/0446; H04W 74/004; H04L 5/0048; H04L 5/0053; H04L 5/0005; H04B 7/0695
See application file for complete search history.

(56) References Cited

U.S. PATENT DOCUMENTS

2014/0334355 A1* 11/2014 Ekpenyong ....... H04W 72/0446
370/280
2015/0341950 A1* 11/2015 Pang ................. H04W 72/1263
370/329
(Continued)

FOREIGN PATENT DOCUMENTS

CN 101784121 A 7/2010
CN 104956760 A 9/2015
(Continued)

OTHER PUBLICATIONS

Nokia et al., "Support for Beam Based Common Control Plane," 3GPP TSG-RAN WG1 #85, R1-165364, May 23-27, 2016, 5 pages, Nanjing, China.
(Continued)

*Primary Examiner* — Ian N Moore
*Assistant Examiner* — Latresa A McCallum
(74) *Attorney, Agent, or Firm* — Slater Matsil, LLP

(57) ABSTRACT

A method includes: configuring, by a base station, at least two types of random access resources, where the at least two types of random access resources include a first-type random access resource and a second-type random access resource; and different types of random access resources are in a one-to-one correspondence with different sending beam forms of a terminal; or the first-type random access resource is associated with resources of different downlink signals, and the second-type random access resource is not associated with the resources of the different downlink signals.

18 Claims, 10 Drawing Sheets

(51) Int. Cl.
*H04W 72/04* (2009.01)
*H04W 74/00* (2009.01)
*H04B 7/06* (2006.01)

(52) U.S. Cl.
CPC ..... *H04W 72/0446* (2013.01); *H04W 74/004* (2013.01); *H04B 7/0695* (2013.01); *H04L 5/0005* (2013.01)

(56) References Cited

U.S. PATENT DOCUMENTS

| | | |
|---|---|---|
| 2015/0359005 A1 | 12/2015 | Wong et al. |
| 2015/0382205 A1 | 12/2015 | Lee et al. |
| 2016/0183295 A1* | 6/2016 | Liu .................. H04W 74/002 370/330 |
| 2016/0192401 A1 | 6/2016 | Park et al. |
| 2016/0219570 A1* | 7/2016 | Guo .................. H04W 74/0833 |
| 2016/0227575 A1* | 8/2016 | Furuskog .......... H04W 72/1268 |
| 2017/0332407 A1* | 11/2017 | Islam ................. H04W 52/42 |
| 2017/0359836 A1* | 12/2017 | Kato .................. H04W 74/08 |
| 2019/0182682 A1* | 6/2019 | Kim ................... H04W 16/28 |

FOREIGN PATENT DOCUMENTS

| | | |
|---|---|---|
| EP | 2076087 A2 | 7/2009 |
| EP | 3432673 A1 | 1/2019 |
| JP | 2009159214 A | 7/2009 |
| KR | 101563469 B1 | 10/2015 |
| WO | 2015147717 A1 | 10/2015 |
| WO | 2018084662 A1 | 5/2018 |

OTHER PUBLICATIONS

Interdigital Communications, "Beam-Based Design Framework for New Radio," 3GPP TSG-RAN WG1 #85, R1-164874, May 23-27, 2016, 5 pages, Nanjing, China.

Ericsson, "On the random access procedure", 3GPP TSG-RAN WG1 #86, R1-167059, Aug. 22-26, 2016, 5 pages, Gothenburg, Sweden.

* cited by examiner

CONFIGURING DIFFERENT TYPES OF RANDOM RESOURCES

CROSS-REFERENCE TO RELATED APPLICATIONS

This application is a continuation of International Application No. PCT/CN2017/097247 filed on Aug. 11, 2017, which claims priority to Chinese Patent Application No. 201610978462.X, filed on Nov. 4, 2016, and Chinese Patent Application No. 201610670239.9, filed on Aug. 12, 2016. The disclosures of the aforementioned applications are hereby incorporated by reference in their entireties

TECHNICAL FIELD

This application relates to the field of communications technologies, and in particular, to a random access method, apparatus, and system, a terminal, and a base station.

BACKGROUND

A random access (RA) process is an inevitable process for establishing a radio link between a terminal and a network. The terminal and the base station can normally transmit data only after the random access process is completed.

In a Long Term Evolution (LTE) system, an RA process is usually as follows. A terminal obtains, by using a system broadcast message, a random access resource and an allocated preamble sequence code set. The terminal then generates a random access preamble sequence based on obtained information. The terminal sends a random access preamble to an evolved NodeB (eNB) on the corresponding random access resource. The eNB performs detection on a random access channel. If finding the random access preamble sequence through detection, the eNB sends feedback information to the terminal on a downlink control channel. After sending the random access preamble sequence, the terminal detects for the feedback information on the downlink control channel within one time window. If the corresponding feedback information is found through detection, it indicates that the random access preamble sequence sent by the terminal is found by the base station through detection. The feedback information further includes an uplink timing advance adjustment value for the terminal. The terminal may achieve uplink synchronization based on the adjustment value, and may further send uplink resource scheduling request information, to subsequently transmit data.

Currently, there is a scenario in which an eNB transmits data through multi-beam sweeping, or a terminal sends data through multi-beam sweeping. In such a scenario, an existing random access mode is inapplicable.

SUMMARY

To resolve a problem in the current system, embodiments of the present invention provide a random access method, apparatus, and system, a terminal, and a base station. The technical solutions are as follows.

According to a first aspect, an embodiment of the present invention provides a random access method. The method includes configuring, by a base station, at least two types of random access resources. The at least two types of random access resources include a first-type random access resource and a second-type random access resource, and different types of random access resources are in a one-to-one correspondence with different sending beam forms of a terminal. Or the first-type random access resource is associated with resources of different downlink signals, and the second-type random access resource is not associated with the resources of the different downlink signals. Or the first-type random access resource is associated with resources of different downlink signals in a first association manner, and the second-type random access resource is associated with the resources of the different downlink signals in a second association manner. The first association manner is different from the second association manner. The method further includes receiving, by the base station, a random access preamble that is sent by the terminal by using the first-type random access resource or the second-type random access resource.

With reference to the first aspect, in a first implementation of the first aspect, the method further includes: sending, by the base station, X first signals and Y second signals. Each of the Y second signals includes random access configuration information, the random access configuration information in each second signal includes at least one of first-type random access configuration information and second-type random access configuration information. The first-type random access configuration information is used to indicate Z first-type random access resources and a correspondence between the Z first-type random access resources and resources of the X first signals, and the second-type random access information is used to indicate the second-type random access resource, or the second-type random access information is used to indicate Z second-type random access resources and a correspondence between the Z second-type random access resources and the resources of the X first signals. The first signal is at least one of a downlink synchronization signal, a broadcast signal, or a downlink measurement pilot signal; the second signal is a broadcast signal or a system message. X, Y, and Z are positive integers; and X, Y, and Z are all greater than 1.

With reference to the first implementation of the first aspect, in a second implementation of the first aspect, the correspondence between the Z first-type random access resources and the resources of the X first signals is: X different first signals are corresponding to time-frequency resources of Z different first-type random access resources. The correspondence between the Z second-type random access resources and the resources of the X first signals is: X different first signals are corresponding to code resources of Z different second-type random access resources. For example, a manner of associating the first-type random access resources with the resources of the X different first signals is different from a manner of associating the second-type random access resources with the resources of the X different first signals.

Further, the correspondence between the Z first-type random access resources and the resources of the X first signals includes: each of the Z first-type random access resources is corresponding to one of different resources of X downlink signals, and the resource is a code resource, a time-domain resource, or a frequency-domain resource. The correspondence between the Z second-type random access resources and the resources of the X first signals includes: each of the Z second-type random access resources is corresponding to one of different resources of X downlink signals, and the resource is a code resource, a time-domain resource, or a frequency-domain resource.

Furthermore, the correspondence between the Z first-type random access resources and the resources of the X first signals includes each of the Z first-type random access resources is corresponding to one of different sequences of X downlink synchronization signals. Or each of the Z first-type random access resources is corresponding to one of different time-domain resources of X downlink synchronization signals. Or each of the Z first-type random access resources is corresponding to one of different frequency-domain resources of X downlink synchronization signals. Or each of the Z first-type random access resources is corresponding to one of different sequences of X downlink measurement pilot signals. Or each of the Z first-type random access resources is corresponding to one of different time-domain resources of X downlink measurement pilot signals. Or each of the Z first-type random access resources is corresponding to one of different frequency-domain resources of X downlink measurement pilot signals. Or each of the Z first-type random access resources is corresponding to one of different scrambling codes of X broadcast signals. Or each of the Z first-type random access resources is corresponding to one of different time-domain resources of X broadcast signals. Or each of the Z first-type random access resources is corresponding to one of different frequency-domain resources of X broadcast signals.

With reference to the second implementation of the first aspect, in a third implementation of the first aspect, a resource of each second signal in the resources of the Y second signals is corresponding to the resources of the X first signals.

Further, a direction of a sending beam of a first signal is the same as a direction of a sending beam of a second signal whose resource is corresponding to that of the first signal.

With reference to the second implementation of the first aspect, in a fourth implementation of the first aspect, a second signal carrying the first-type random access configuration information and a second signal carrying the second-type random access configuration information are different signals, and the second signal carrying the second-type random access configuration information is sent before the second signal carrying the first-type random access configuration information.

Further, the second signal carrying the second-type random access configuration information is a signal on a physical broadcast channel PBCH, and the second signal carrying the first-type random access configuration information is an essential SIB. Or the second signal carrying the second-type random access configuration information is a signal on a PBCH, and the second signal carrying the first-type random access configuration information is an SIB1. Or the second signal carrying the second-type random access configuration information is an essential SIB, and the second signal carrying the first-type random access configuration information is an SIB1.

With reference to the second implementation of the first aspect, in a fifth implementation of the first aspect, the first-type random resource configuration information in each second signal includes a correspondence between all first signals configured for a cell to which the second signal belongs and the first-type random access resources; or the first-type random access configuration information in each second signal includes a correspondence between a subset of all first signals configured for a cell to which the second signal belongs and a subset of the first-type random access resources.

Further, first signals in a same subset are sent within a same time unit, and the time unit is a subframe, a slot, or a mini-slot.

With reference to the second implementation of the first aspect, in a sixth implementation of the first aspect, the sending, by the base station, X first signals and Y second signals includes periodically sending, by the base station, the X first signals and the Y second signals; and sending, by the base station, the X first signals and the Y second signals in one period through beam sweeping.

With reference to the sixth implementation of the first aspect, in a seventh implementation of the first aspect, the X first signals are sent by using different beams, and the base station receives, by using a receiving beam in a same direction as a sending beam of a first signal, a random access preamble that is sent by using a random access resource corresponding to a resource of the first signal.

With reference to any one of the first aspect, or the first to the seventh implementations of the first aspect, in an eighth implementation of the first aspect, a system parameter of the first-type random access resource is different from a system parameter of the second-type random access resource, and the system parameter includes a subcarrier spacing and a symbol length.

With reference to any one of the first aspect, or the first to the seventh implementations of the first aspect, in a ninth implementation of the first aspect, the first-type random access resource is corresponding to a first-type random access preamble format, the second-type random access resource is corresponding to a second-type random access preamble format, the first-type random access preamble format includes a cyclic prefix part and a preamble sequence part, the preamble sequence part of the first-type random access preamble format includes a single sequence, the second-type random access preamble format includes a cyclic prefix part and a preamble sequence part, and the preamble sequence part of the second-type random access preamble format includes a plurality of repeated sequences. Or he first-type random access resource is corresponding to a first-type random access preamble format, the second-type random access resource is corresponding to a second-type random access preamble format, the first-type random access preamble format and the second-type random access preamble format each include a cyclic prefix part and a preamble sequence part, and the preamble sequence part includes a single sequence.

With reference to the ninth implementation of the first aspect, in a tenth implementation of the first aspect, a length of a single sequence in the first-type access preamble format is greater than a length of a single sequence in the second-type random access preamble format.

With reference to any one of the first aspect, or the first to the seventh implementations of the first aspect, in an eleventh implementation of the first aspect, a sending beam form of the terminal includes: sending the random access preamble on the first-type random access resource by using an omnidirectional beam; or sending the random access preamble on the second-type random access resource by using a plurality of directional beams.

With reference to the eleventh implementation of the first aspect, in a twelfth implementation of the first aspect, a quantity of directional beams used by the terminal is corresponding to different random preamble sequence groups.

With reference to the first aspect, in a thirteenth implementation of the first aspect, the receiving, by the base station, a random access preamble that is sent by the terminal by using the first-type random access resource or the second-type random access resource includes: receiving, by the base station by using a single beam, the random access preamble that is sent by the terminal on the first-type random access resource. Or the receiving, by the base station, a random access preamble alternately receiving, by the base station by using a plurality of beams, the random access preamble that is sent by the terminal on the second-type random access resource.

With reference to the thirteenth implementation of the first aspect, in a fourteenth implementation of the first aspect, the method further includes: sending, by the base station, a random access answer to the terminal, where the random access answer includes indication information used to indicate an optimal directional beam of the terminal.

With reference to any one of the first aspect, or the first to the seventh implementations of the first aspect, in a fifteenth implementation of the first aspect, the first-type random access resource is in a one-to-one correspondence with a first-type random access answer resource, K second-type random access resources are corresponding to one second-type random access answer resource, and K is an integer greater than 1.

With reference to the fifteenth implementation of the first aspect, in a sixteenth implementation of the first aspect, every K consecutive second-type random access resources are corresponding to one second-type random access answer resource.

According to a second aspect, an embodiment of the present invention provides a random access method, where the method includes: determining, by a terminal, at least two types of random access resources. The at least two types of random access resources include a first-type random access resource and a second-type random access resource. Different types of random access resources are in a one-to-one correspondence with different sending beam forms of the terminal. Or the first-type random access resource is associated with resources of different downlink signals, and the second-type random access resource is not associated with the resources of the different downlink signals. Or the first-type random access resource is associated with resources of different downlink signals in a first association manner, and the second-type random access resource is associated with the resources of the different downlink signals in a second association manner, where the first association manner is different from the second association manner. The method further includes sending, by the terminal, a random access preamble by using the first-type random access resource or the second-type random access resource.

With reference to the second aspect, in a first implementation of the second aspect, the method further includes: receiving, by the terminal, first signals and second signals that are sent by a base station, where each of the second signals includes random access configuration information, the random access configuration information in each second signal includes at least one of first-type random access configuration information and second-type random access configuration information, the first-type random access configuration information is used to indicate Z first-type random access resources and a correspondence between the Z first-type random access resources and resources of the X first signals, and the second-type random access information is used to indicate the second-type random access resource, or the second-type random access configuration information is used to indicate Z second-type random access resources and a correspondence between the Z second-type random access resources and the resources of the X first signals. The first signal is at least one of a downlink synchronization signal, a broadcast signal, or a downlink measurement pilot signal; the second signal is a broadcast signal or a system message; X, Y, and Z are positive integers; and X, Y, and Z are all greater than 1.

With reference to the first implementation of the second aspect, in a second implementation of the second aspect, the correspondence between the Z first-type random access resources and the resources of the X first signals is: X different first signals are corresponding to time-frequency resources of Z different first-type random access resources; and the correspondence between the Z second-type random access resources and the resources of the X first signals is: X different first signals are corresponding to code resources of Z different second-type random access resources.

Further, the correspondence between the Z first-type random access resources and the resources of the X first signals includes: each of the Z first-type random access resources is corresponding to one of different resources of X downlink signals, and the resource is a code resource, a time-domain resource, or a frequency-domain resource. The correspondence between the Z second-type random access resources and the resources of the X first signals includes: each of the Z second-type random access resources is corresponding to one of different resources of X downlink signals, and the resource is a code resource, a time-domain resource, or a frequency-domain resource.

Furthermore, the correspondence between the Z first-type random access resources and the resources of the X first signals includes: each of the Z first-type random access resources is corresponding to one of different sequences of X downlink synchronization signals. Or each of the Z first-type random access resources is corresponding to one of different time-domain resources of X downlink synchronization signals. Or each of the Z first-type random access resources is corresponding to one of different frequency-domain resources of X downlink synchronization signals. Or each of the Z first-type random access resources is corresponding to one of different sequences of X downlink measurement pilot signals. Or each of the Z first-type random access resources is corresponding to one of different time-domain resources of X downlink measurement pilot signals. Or each of the Z first-type random access resources is corresponding to one of different frequency-domain resources of X downlink measurement pilot signals. Or each of the Z first-type random access resources is corresponding to one of different crambling codes of X broadcast signals. Or each of the Z first-type random access resources is corresponding to one of different time-domain resources of X broadcast signals. Or each of the Z first-type random access resources is corresponding to one of different frequency-domain resources of X broadcast signals.

With reference to the second implementation of the second aspect, in a third implementation of the second aspect, a resource of each second signal in the resources of the Y second signals is corresponding to the resources of the X first signals.

Further, a direction of a sending beam of a first signal is the same as a direction of a sending beam of a second signal whose resource is corresponding to that of the first signal.

With reference to the second implementation of the second aspect, in a fourth implementation of the second aspect, a second signal carrying the first-type random access configuration information and a second signal carrying the second-type random access configuration information are different signals, and the second signal carrying the second-type random access configuration information is sent before the second signal carrying the first-type random access configuration information.

Further, the second signal carrying the second-type random access configuration information is a signal on a physical broadcast channel PBCH, and the second signal carrying the first-type random access configuration information is an essential SIB. Or the second signal carrying the second-type random access configuration information is a signal on a PBCH, and the second signal carrying the first-type random access configuration information is an SIB1. Or the second signal carrying the second-type random access configuration information is an essential SIB, and the second signal carrying the first-type random access configuration information is an SIB1.

With reference to the second implementation of the second aspect, in a fifth implementation of the second aspect, the first-type random resource configuration information in each second signal includes a correspondence between all first signals configured for a cell to which the second signal belongs and the first-type random access resources; or the first-type random access configuration information in each second signal includes a correspondence between a subset of all first signals configured for a cell to which the second signal belongs and a subset of the first-type random access resources.

With reference to any one of the second aspect, or the first to the fifth implementations of the second aspect, in a sixth implementation of the second aspect, the first-type random access resource is corresponding to a first-type random access preamble format, the second-type random access resource is corresponding to a second-type random access preamble format, the first-type random access preamble format includes a cyclic prefix part and a preamble sequence part, the preamble sequence part of the first-type random access preamble format includes a single sequence, the second-type random access preamble format includes a cyclic prefix part and a preamble sequence part, and the preamble sequence part of the second-type random access preamble format includes a plurality of repeated sequences. Or the first-type random access resource is corresponding to a first-type random access preamble format, the second-type random access resource is corresponding to a second-type random access preamble format, the first-type random access preamble format and the second-type random access preamble format each include a cyclic prefix part and a preamble sequence part, and the preamble sequence part includes a single sequence.

With reference to the sixth implementation of the second aspect, in a seventh implementation of the second aspect, a length of a single sequence in the first-type access preamble format is greater than a length of a single sequence in the second-type random access preamble format.

With reference to the second aspect, in an eighth implementation of the second aspect, the sending, by the terminal, a random access preamble by using the first-type random access resource or the second-type random access resource includes. When reference signal received power obtained by the terminal through measurement is greater than a specified threshold, sending the random access preamble by selecting the first-type random access resource and by using an omnidirectional beam. Or when reference signal received power obtained by the terminal through measurement is less than or equal to the specified threshold, sending the random access preamble by selecting the second-type random access resource and by using a plurality of directional beams.

With reference to the eighth implementation of the second aspect, in a ninth implementation of the second aspect, a quantity of directional beams used by the terminal is corresponding to different random preamble sequence groups.

With reference to the eighth implementation of the second aspect, in a tenth implementation of the second aspect, the method further includes: receiving, by the terminal, a random access answer sent by the base station, where the random access answer includes indication information used to indicate an optimal sending beam of the terminal.

With reference to the eighth implementation of the second aspect, in an eleventh implementation of the second aspect, the method further includes: sending, by the terminal, the random access preamble by performing polling on K directional beams on K second-type random access resources by using same transmit power.

With reference to the eleventh implementation of the second aspect, in a twelfth implementation of the second aspect, the method further includes: after the terminal sends the random access preamble by performing polling on the K directional beams on the K second-type random access resources by using the same transmit power. If the terminal receives no random access answer, increasing the transmit power, and then re-sending the random access preamble by performing polling on the K directional beams on the K random access resources by using same transmit power, where K is an integer greater than 1.

With reference to any one of the second aspect, or the first to the fifth implementations of the second aspect, in a thirteenth implementation of the second aspect, the first-type random access resource is in a one-to-one correspondence with a first-type random access answer resource, K second-type random access resources are corresponding to one second-type random access answer resource, and K is an integer greater than 1.

With reference to the twelfth implementation of the second aspect, in a fourteenth implementation of the second aspect, every K consecutive second-type random access resources are corresponding to one second-type random access answer resource.

In the first aspect and the second aspect, the random access resource includes at least one of a time-frequency resource, a sequence resource, and a cyclic shift resource that are used to send a random access preamble.

According to a third aspect, an embodiment of the present invention provides a random access apparatus. The apparatus includes units configured to perform the method in the first aspect, for example, a configuration unit and a sending unit.

According to a fourth aspect, an embodiment of the present invention provides a random access apparatus. The AP includes units configured to perform the method in the second aspect, for example, a determining unit and a receiving unit.

According to a fifth aspect, an embodiment of the present invention provides a random access system. The system includes a base station and a terminal. The base station includes the random access apparatus provided in the third aspect or any possible design of the third aspect. The terminal includes the random access apparatus provided in the fourth aspect or any possible design of the fourth aspect.

According to a sixth aspect, an embodiment of the present invention provides a base station. The base station includes a memory, and a processor connected to the memory. The memory is configured to store a software program and a module. When the processor is configured to run or execute the software program and the module stored in the memory, the processor may perform the method according to the first aspect.

According to a seventh aspect, an embodiment of the present invention further provides a computer-readable medium, configured to store program code to be executed by a terminal. The program code includes an instruction used to perform the method according to the first aspect.

According to an eighth aspect, an embodiment of the present invention provides a terminal. The terminal includes a memory, and a processor connected to the memory. The memory is configured to store a software program and a module. When the processor is configured to run or execute the software program and the module stored in the memory, the processor may perform the method according to the second aspect.

According to a ninth aspect, an embodiment of the present invention further provides a computer-readable medium, configured to store program code to be executed by a terminal. The program code includes an instruction used to perform the method according to the second aspect.

DETAILED DESCRIPTION OF ILLUSTRATIVE EMBODIMENTS

The following further describes the implementations of the present invention in detail with reference to the accompanying drawings.

A "module" mentioned in this specification is a program or an instruction that is stored in a memory and that can implement some functions. A "unit" mentioned in this specification is a functional structure divided based on logic. The "unit" may be implemented by only hardware, or implemented by a combination of software and hardware.

In this specification, "a plurality of" means at least two. "And/or" describes an association relationship between associated objects and represents that three relationships may exist. For example, A and/or B may represent the following three cases: Only A exists, both A and B exist, and only B exists. The character "/" usually indicates an "or" relationship between associated objects.

Figure 1:
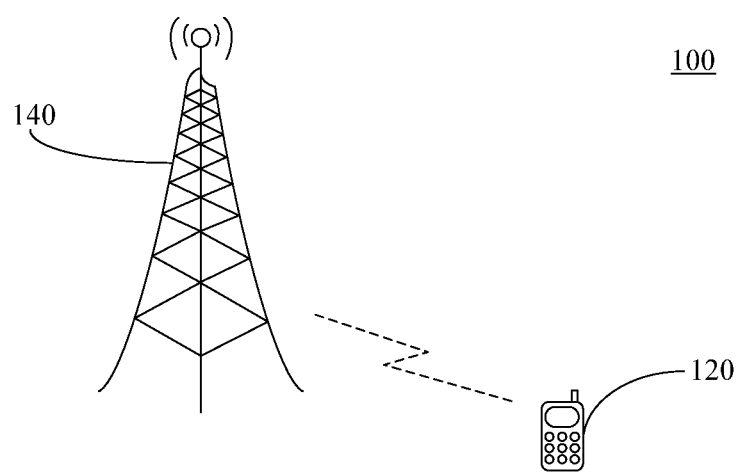
FIG. 1 is a schematic structural diagram of a random access system according to an embodiment of the present invention.

FIG. 1 is a schematic structural diagram of a random access system 100 according to an embodiment of this application. The random access system 100 may be an LTE system or a 5G system. The random access system 100 includes at least one terminal 120 and at least one base station 140.

The terminal 120 may be a device such as a personal communications service (PCS) phone, a cordless telephone set, a Session Initiation Protocol (SIP) phone, a wireless local loop (WLL) station, or a personal digital assistant (PDA). The terminal may also be referred to as a system, a subscriber unit, a subscriber station, a mobile station, a mobile console (Mobile), a remote station, an access point, a remote terminal, an access terminals, a user terminal, a user agent, a user device, or user equipment.

The terminal 120 communicates with one or more access network devices by using a radio access network (RAN).

The base station 140 acts as a router between the terminal 120 and a rest part of an access network. The rest part of the access network may include an Internet Protocol (IP) network. The base station may further coordinate attribute management for an air interface. For example, the base station may be a base transceiver station (BTS) in the Global System for Mobile Communications (GSM) or a Code Division Multiple Access (CDMA) system, may be a NodeB (NodeB) in Wideband Code Division Multiple Access (WCDMA), or may be an eNB in LTE. This is not limited in this application.

Figure 2A:
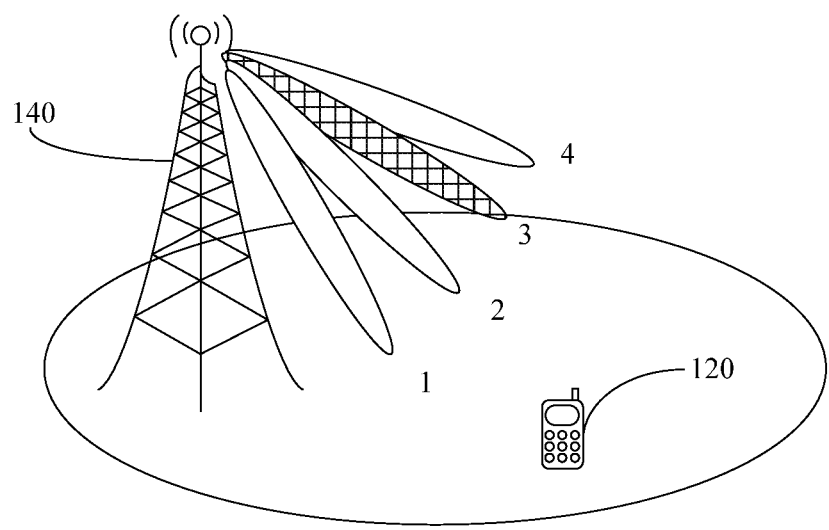
FIG. 2a is a schematic diagram of an application scenario according to an embodiment of the present invention.
Figure 2B:
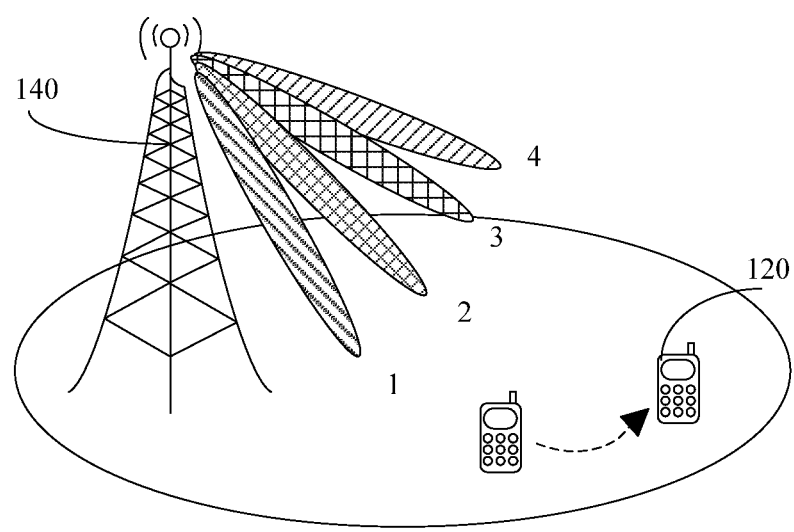
FIG. 2b is a schematic diagram of another application scenario according to an embodiment of the present invention.
Figure 2C:
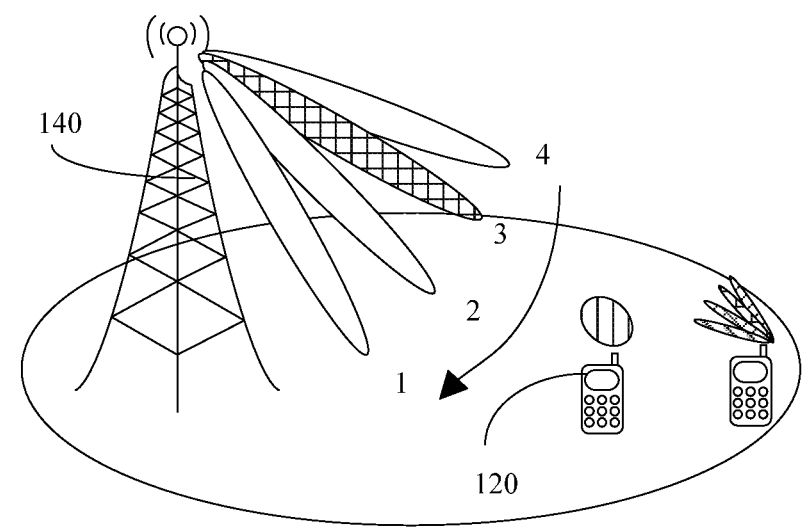
FIG. 2c is a schematic diagram of still another application scenario according to an embodiment of the present invention.

The following describes application scenarios of the embodiments of the present invention based on the system shown in FIG. 1, with reference to FIG. 2a to FIG. 2c.

As shown in FIG. 2a and FIG. 2b, the base station 140 serves the terminal 120. The base station 140 receives and sends signals by using a multi-beam sweeping technology, to resist channel attenuation, control a signal propagation loss, and further ensure signal coverage of the base station. In the multi-beam sweeping technology, the base station 140 controls, by using a plurality of beams, directional beams with relatively narrow edges to separately send and receive signals on different resources, so as to sweep a coverage area of the base station 140 by using the plurality of directional beams. The different resources may be frequency-domain resources (namely, frequencies). For example, in a same subframe, different frequency bands or time-domain resources (namely, time) may be used for different directional beams for sending.

In FIG. 2a and FIG. 2b, the base station 140 uses four directional beams: a beam 1, a beam 2, a beam 3, and a beam 4. It can be learned from the figures that each directional beam is directed at a different part in the coverage area of the base station 140. The coverage area of the base station 140 is swept by using the plurality of directional beams. It should be noted that a quantity of directional beams used by the base station 140 is merely an example. This is not limited in this embodiment of the present invention.

In actual application, the base station 140 may scan for a signal by using a mechanically controlled directional antenna. The mechanically controlled directional antenna has a relatively narrow directional beam that covers a part of the coverage area of the base station 140. The mechanically controlled directional antenna moves with time, and therefore the directional beam of the mechanically controlled directional antenna sweeps the coverage area of the base station 140. Alternatively, the base station 140 may obtain, by using an array antenna and through beamforming, a directional beam that covers a part of the coverage area of the base station, and control the directional beam to sweep the coverage area of the base station 140. The beamforming is a signal preprocessing technology based on an antenna array. In the beamforming, a weighting coefficient of each array element of the antenna array is adjusted to generate a directional beam. In the beamforming, an analog beam generated by using a radio frequency or a baseband digital beam may be obtained.

When the directional beams of the base station 140 sweep the coverage area of the base station 140, and the terminal 120 is covered by a specific directional beam of the base station 140, the terminal 120 may obtain data or a signal corresponding to the specific beam.

To perform data transmission with the base station 140, the terminal 120 in the coverage area of the base station 140 needs to first establish a wireless connection to the base station 140 through a random access process. The random access process may be implemented in the following manner: The base station 140 first configures a random access resource for each directional beam, and sends information about the configured random access resource by using a system broadcast message. The terminal initiates the random access process by using a random access resource corresponding to a directional beam corresponding to a downlink signal that is found by the terminal through detection, so as to establish the wireless connection to the base station 140.

In a scenario shown in FIG. 2a, the directional beams of the base station 140 are not calibrated. Calibration means that a receiving beam and a sending beam of the base station have uplink/downlink reciprocity. In this case, a receiving beam in a same direction as an optimal sending beam is also optimal. In multi-beam sweeping, if the beams of the base station have been calibrated, the base station 140 may determine an optimal receiving beam based on an optimal sending beam. If the beams of the base station 140 are not calibrated, the base station 140 cannot determine an optimal receiving beam based on an optimal sending beam. For example, in FIG. 2a, for the terminal 120, the optimal sending beam of the base station is the beam 3. Because the directional beams are not calibrated, the optimal receiving beam may be the beam 1, or may be the beam 3. Therefore, the base station 2 cannot receive, by using the optimal receiving beam, a random access preamble sent by the terminal 1. As a result, random access of the terminal may finally fail.

In a scenario shown in FIG. 2b, the terminal 120 is moving at a high speed. In this case, the terminal 120 quickly passes through areas at which the beam 1, the beam 2, and the beam 3 are separately directed, and moves to an area at which the beam 4 is directed. A moving path is indicated by an arrow in FIG. 2b. If the base station 140 receives, by using only one of the four directional beams, data sent by the terminal 120, the base station 140 may not completely receive a random access preamble sent by the terminal 120. As a result, the terminal 120 cannot establish a wireless connection to the base station 140.

As shown in FIG. 2, the base station 140 serves the terminal 120. The terminal 120 may send a signal through multi-beam sweeping (send a same signal by sequentially using a plurality of directional beams), or may send a signal by using one omnidirectional beam. As shown in FIG. 2c, in comparison, the omnidirectional beam 5 has a smaller beam gain, and the directional beams 1 to 4 have larger beam gains and longer transmission distances. Therefore, a terminal 120a at a central location in the coverage area of the base station 140 may send data by using an omnidirectional beam, and a terminal 120b at an edge location in the coverage area of the base station 140 may send data by using directional beams. In a random access process, the terminal 120 may send a random access preamble sequence by sequentially using the beam 1, the beam 2, the beam 3, and the beam 4. In this case, if the base station 140 detects for the random access preamble only once, it is very likely that the base station 140 cannot find, through detection, the random access preamble sent by the terminal 120. As a result, random access of the terminal 120 fails.

It can be learned that random access performed according to the existing random access process is not suitable for the foregoing three scenarios. Therefore, an embodiment of the present invention provides a random access method. A first-type random access resource and a second-type random access resource are configured; and the first-type random access resource is associated with resources of different downlink signals, and the second-type random access resource is not associated with the resources of the different downlink signals; or the first-type random access resource and the second-type random access resource are associated with resources of different downlink signals in different association manners, so that a terminal may select a resource for sending a random access preamble, and a base station may receive, in different forms, the random access preamble sent by the terminal. Alternatively, the first-type random access resource and the second-type random access resource may be corresponding to different sending beam forms of the terminal, so that the terminal may select a sending beam form depending on an actual requirement, and further, random access performance and an access time may be flexibly configured.

The following describes implementation of a base station and a terminal provided in the embodiments of the present invention, with reference to specific hardware structures.

Figure 3:
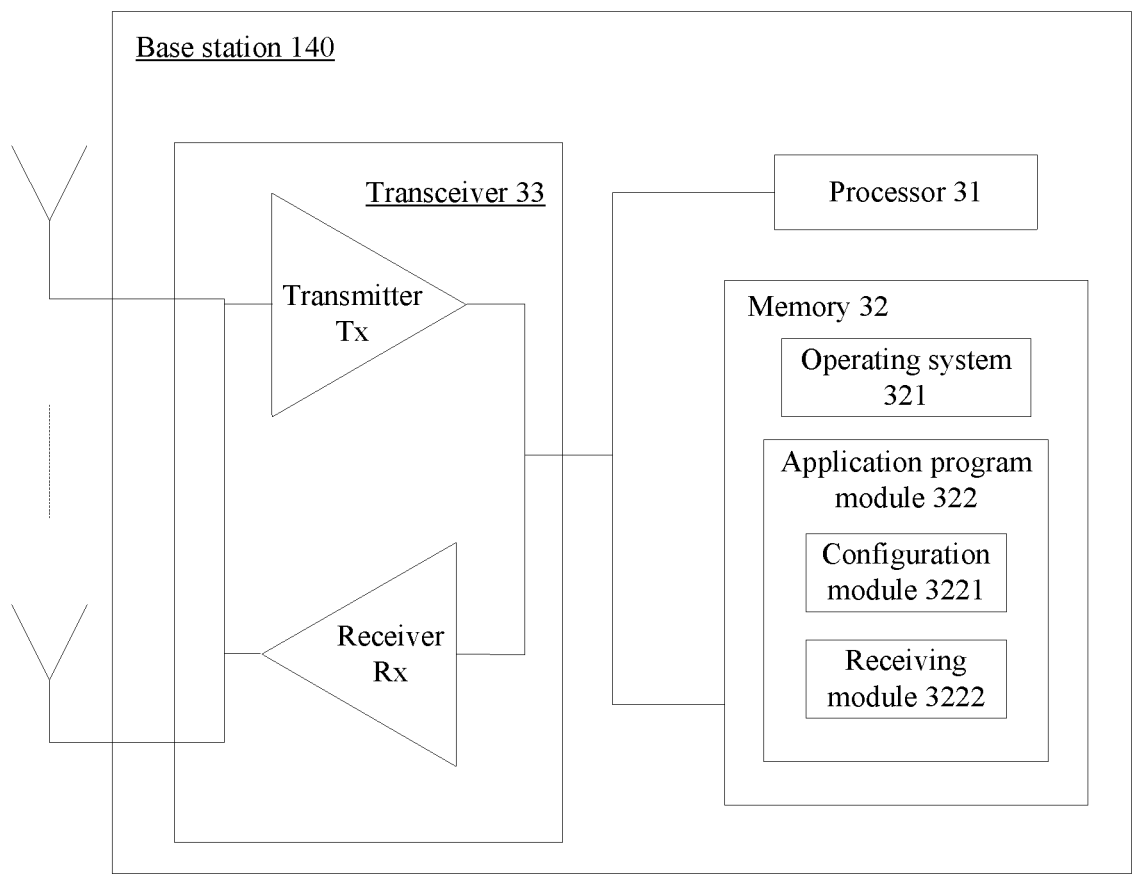
FIG. 3 is a hardware structure diagram of a base station according to an embodiment of the present invention.

FIG. 3 is a structural block diagram of a base station 140 according to an embodiment of the present invention. Referring to FIG. 3, the base station 140 may include parts such as a processor 31 including one or more processing cores, a memory 32 including one or more computer-readable storage media, and a transceiver 33. The processor 31 may be connected to the memory 32 and the transceiver 33 by using a bus 34. A person skilled in the art may understand that the structure shown in FIG. 3 does not constitute any limitation on the base station 140. The base station 140 may include more or fewer parts than those shown in the figure, or may combine some parts, or may have a different layout of parts.

The processor 31 is a control center of the base station 140, connects various parts of the entire base station 140 by using various interfaces and lines, and executes various functions and data processing of the base station 140 by running or executing a software program and/or an application program module stored in the memory 32 and by invoking data stored in the memory 32, so as to perform overall monitoring on the base station 140. Optionally, the processor 31 may include one or more processing units. The processing unit may be a central processing unit (CPU), a network processor (NP), or the like.

The transceiver 33 includes a receiver Rx and a transmitter Tx. The transceiver 33 may alternatively be implemented as a communications chip. The communications chip may include a receiving module, a transmit module, a modem module, and the like, and is configured to: modulate or demodulate information, and receive or send the information by using a radio signal. The transceiver 33 is controlled by the processor 31.

The memory 32 may be configured to store various types of data, such as various configuration parameters, and the software program and/or the application program module. The software program and/or the application program module may be executed by the processor 31. The memory 32 may mainly include a program storage area and a data storage area. The program storage area may store an operating system 321 and an application program module 322 required by at least one function, such as a configuration module and a receiving module. The data storage area may store data created based on use of the base station 140, such as configuration information and a random access preamble format. In addition, the memory 32 may include a high-speed random access memory, or may include a nonvolatile memory, such as at least one magnetic disk storage, a flash memory device, or another volatile solid-state storage device. Correspondingly, the memory 32 may further include a memory controller, to enable the processor 31 to access the memory 32.

The application program module 322 includes at least a configuration module 3221 configured to configure a resource, and a receiving module 3222 configured to receive information.

The configuration module 3221 is configured to configure at least two types of random access resources. The at least two types of random access resources include a first-type random access resource and a second-type random access resource. Different types of random access resources are in a one-to-one correspondence with different sending beam forms of a terminal; or the first-type random access resource is associated with resources of different downlink signals, and the second-type random access resource is not associated with the resources of the different downlink signals; or the first-type random access resource is associated with resources of different downlink signals in a first association manner, and the second-type random access resource is associated with the resources of the different downlink signals in a second association manner, where the first association manner is different from the second association manner.

The receiving module 3222 is configured to receive a random access preamble that is sent by the terminal by using the first-type random access resource or the second-type random access resource.

Figure 5A:
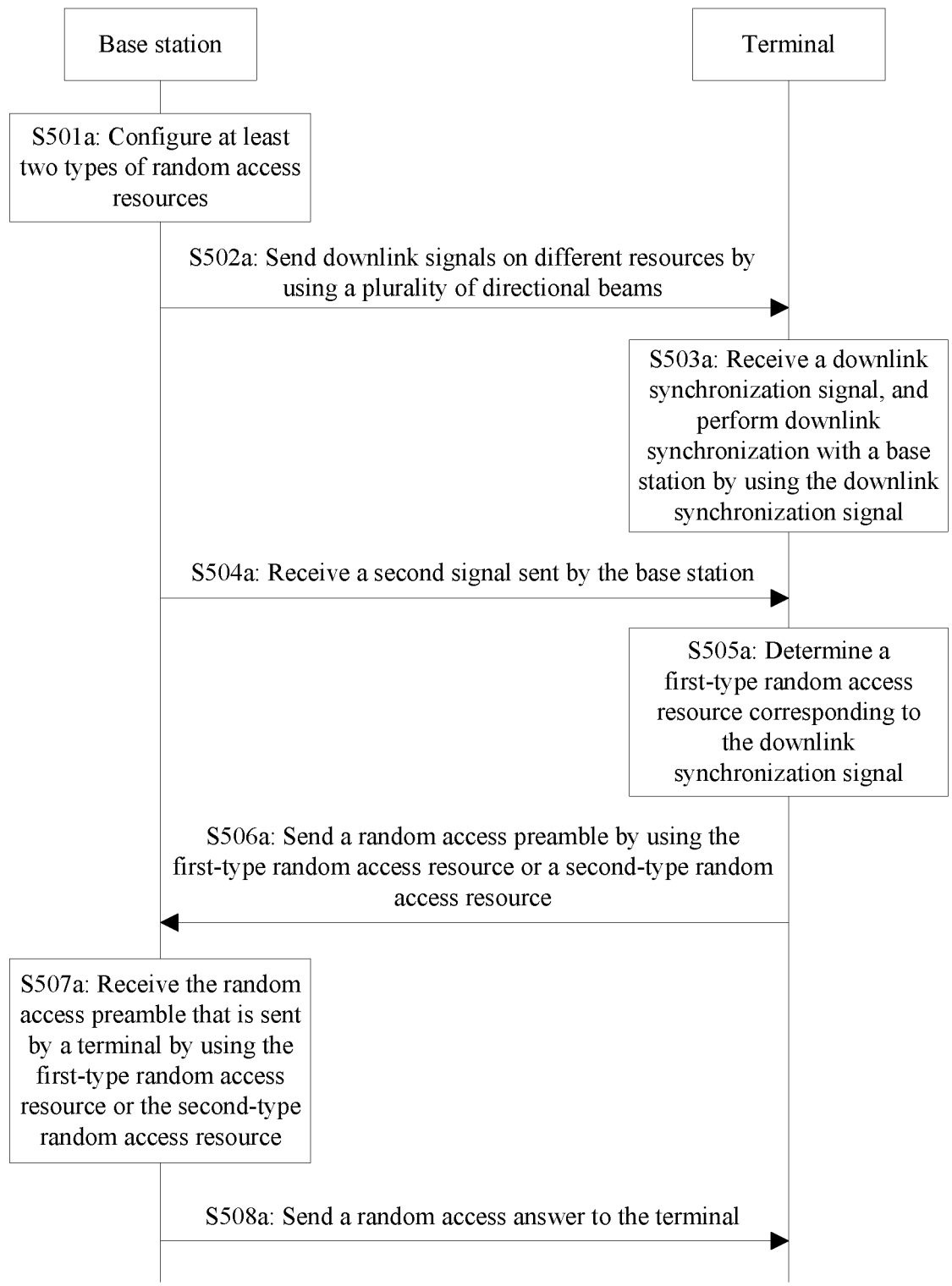
FIG. 5a is a flowchart of a random access method according to an embodiment of the present invention.
Figure 5B:
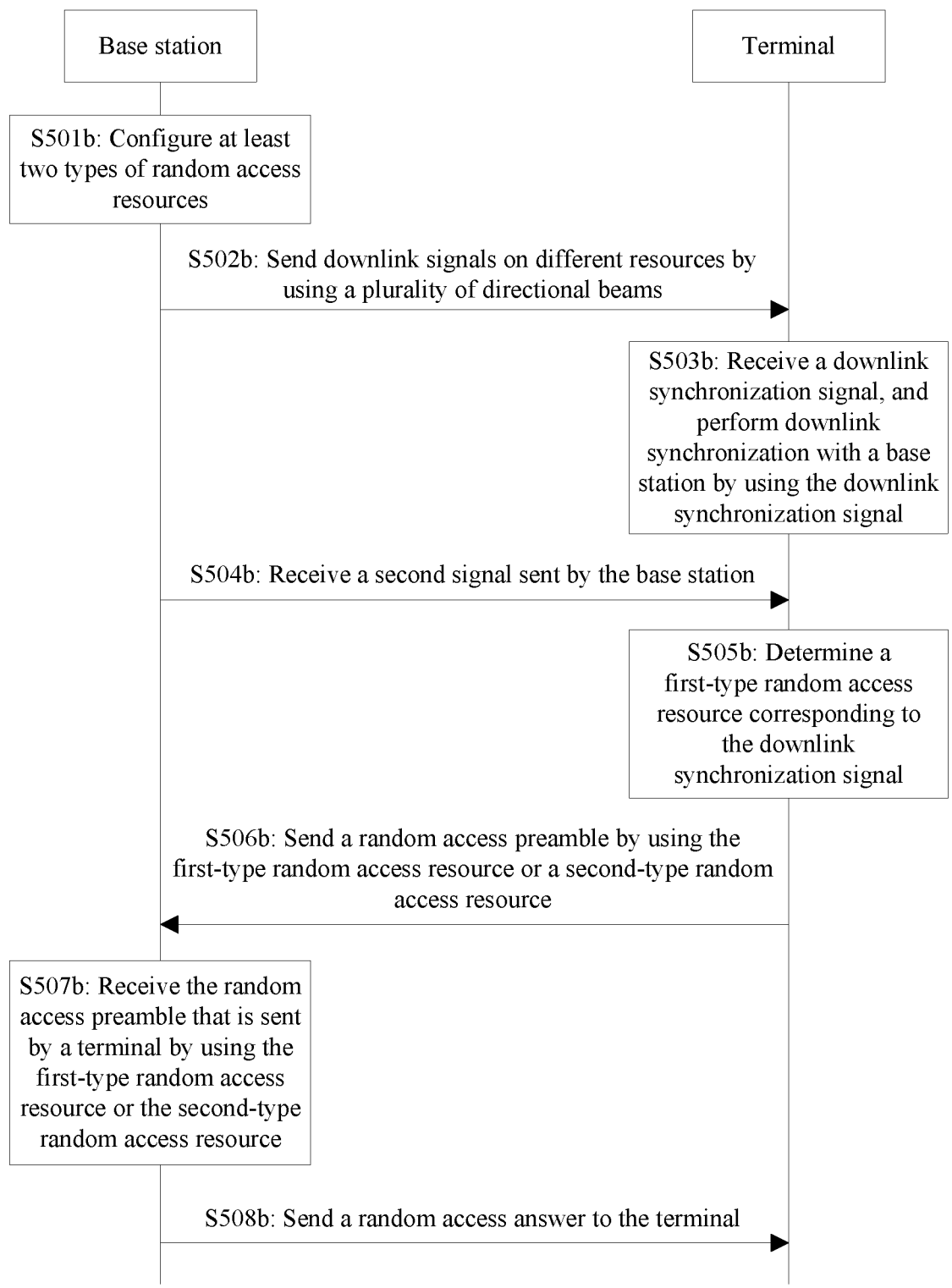
FIG. 5b is a flowchart of a random access method according to an embodiment of the present invention.
Figure 8:
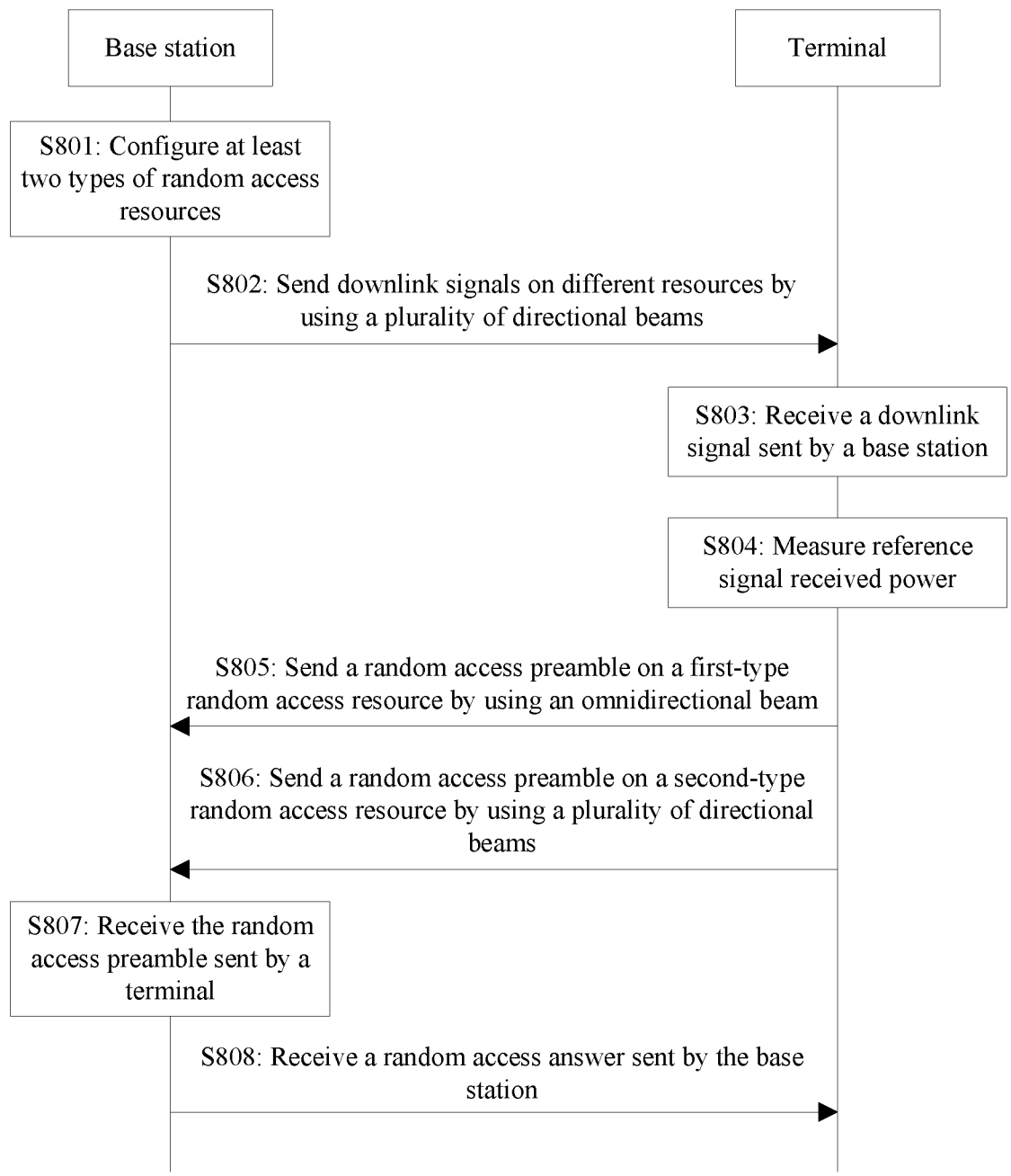
FIG. 8 is a flowchart of another random access method according to an embodiment of the present invention.

Optionally, the processor 31 is configured to execute various modules in the application program module 322, to perform steps that need to be performed by a base station in FIG. 5*a*, FIG. 5*b*, and FIG. 8.

Figure 4:
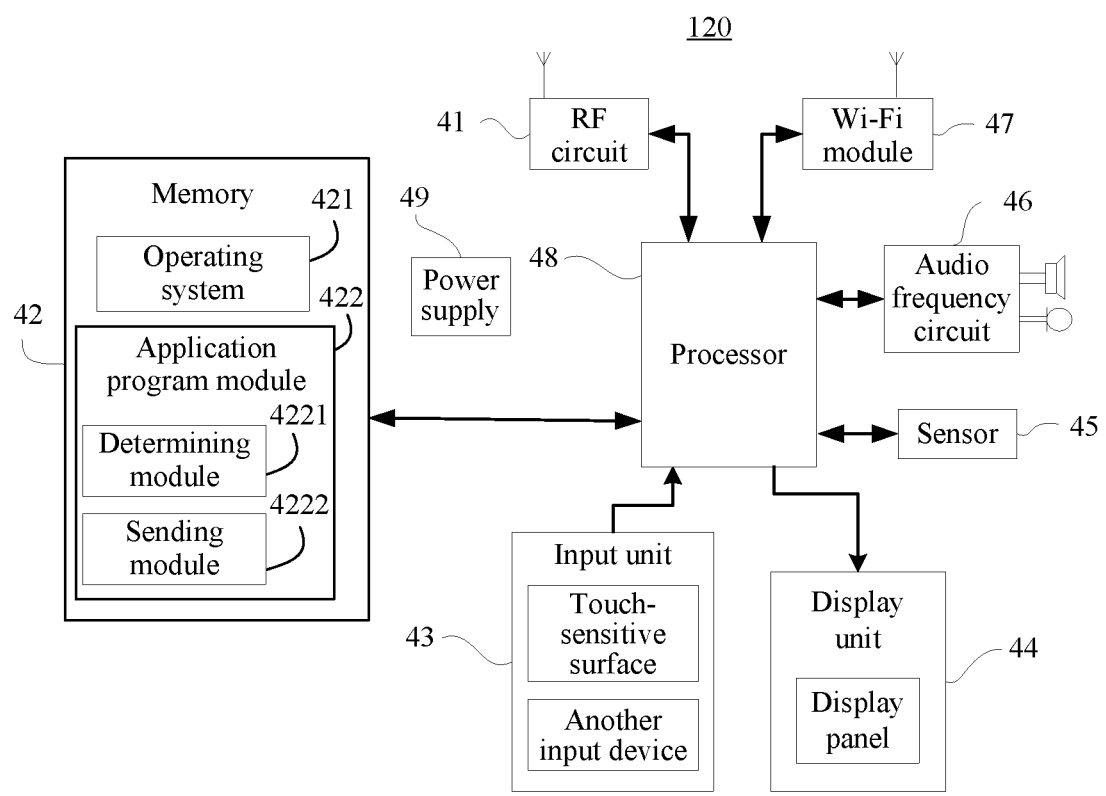
FIG. 4 is a hardware structure diagram of a terminal according to an embodiment of the present invention.

FIG. 4 shows a hardware structure of a terminal 120 according to an embodiment of the present invention. As shown in FIG. 4, the terminal 120 may include parts such as a radio frequency (RF) circuit 41, a memory 42 including one or more computer-readable storage media, an input unit 43, a display unit 44, a sensor 45, an audio frequency circuit 46, a Wireless Fidelity (Wi-Fi) module 47, a processor 48 including one or more processing cores, and a power supply 49. A person skilled in the art may understand that the hardware structure shown in FIG. 4 does not constitute any limitation on the terminal. The terminal may include more or fewer parts than those shown in the figure, or may combine some parts, or may have a different layout of parts.

The processor 48 is a control center of the terminal 120, connects various parts of the entire terminal 120 by using various interfaces and lines, and executes various functions and data processing of the terminal 120 by running or executing a software program and/or an application program module stored in the memory 42 and by invoking data stored in the memory 42, so as to perform overall monitoring on the terminal 120. Optionally, the processor 48 may include one or more processing cores. Optionally, the processor 48 may integrate an application processor and a modem processor. The application processor mainly processes an operating system, a user interface, an application program, and the like. The modem processor mainly processes wireless communication. It may be understood that the modem processor may alternatively not be integrated into the processor 48.

The RF circuit 41 may be configured to: receive and send information, or receive and send signals in a call process, and especially, receive downlink information of a base station and send the downlink information to one or more processors 48 for processing. Usually, the RF circuit 41 includes but is not limited to an antenna, at least one amplifier, a tuner, one or more oscillators, a subscriber identity module (SIM) card, a transceiver, a coupler, a low noise amplifier (LNA), a duplexer, and the like. In addition, the RF circuit 41 may further communicate with a network and another device through wireless communication. For the wireless communication, any communications standard or protocol may be used, including but not limited to Global System for Mobile Communications (GSM), General Packet Radio Service (GPRS), CDMA, WCDMA, LTE, an email, a short message service (SMS), and the like.

The memory 42 may be configured to store various types of data, such as various configuration parameters, and the software program and/or the application program module. The software program and/or the application program module may be executed by the processor 48. The memory 42 may mainly include a program storage area and a data storage area. The program storage area may store an operating system 421 and an application program module 422 required by at least one function, such as a determining module and a sending module. The data storage area may store data created based on use of the terminal 120, such as configuration information and a random access preamble format. In addition, the memory 42 may include a high-speed random access memory, or may include a nonvolatile memory, such as at least one magnetic disk storage, a flash memory device, or another volatile solid-state storage device. Correspondingly, the memory 42 may further include a memory controller, to enable the processor 48 and the input unit 43 to access the memory 42.

The application program module 422 includes at least a determining module 4221 configured to determine a resource, and a sending module 4222 configured to send information.

The determining module 4221 is configured to determine at least two types of random access resources. The at least two types of random access resources include a first-type random access resource and a second-type random access resource. Different types of random access resources are in a one-to-one correspondence with different sending beam forms of the terminal; or the first-type random access resource is associated with resources of different downlink signals, and the second-type random access resource is not associated with the resources of the different downlink signals; or the first-type random access resource is associated with resources of different downlink signals in a first association manner, and the second-type random access resource is associated with the resources of the different downlink signals in a second association manner, where the first association manner is different from the second association manner.

The sending module 4222 is configured to send a random access preamble by using the first-type random access resource or the second-type random access resource.

Optionally, the processor 48 is configured to execute various modules in the application program module 422, to perform steps that need to be performed by a terminal in FIG. 5a, FIG. 5b, and FIG. 8.

FIG. 5a shows a random access method according to an embodiment of the present invention. The method is implemented by using the system shown in FIG. 1, and is applicable to the scenarios shown in FIG. 2a and FIG. 2b. In the embodiment shown in FIG. 5a, the method includes the following steps.

Step S501a: A base station configures at least two types of random access resources.

In this embodiment, the at least two types of random access resources include a first-type random access resource and a second-type random access resource. The first-type random access resource is associated with resources of different downlink signals, and the second-type random access resource is not associated with the resources of the different downlink signals.

The first-type random access resource may include one or more resources, and the second-type random access resource may include one or more resources.

This embodiment is described in detail by using an example in which the first-type random access resource is associated with resources of different downlink synchronization signals, and the second-type random access resource is not associated with the resources of the different downlink synchronization signals.

Figure 6A:
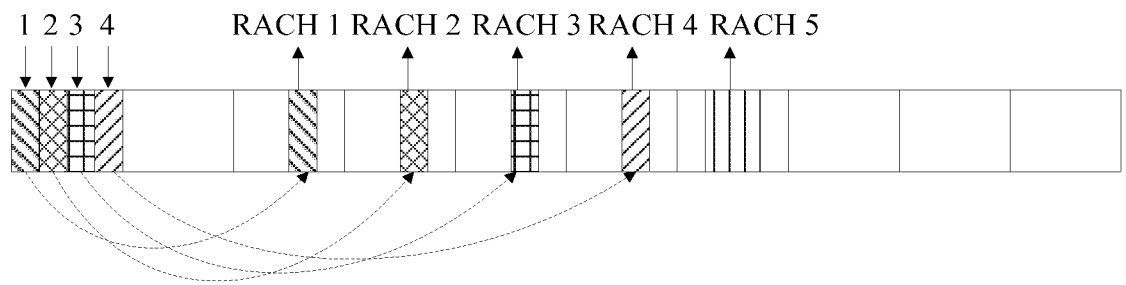
FIG. 6a shows an association relationship between two types of random access resources and downlink synchronization signals.

FIG. 6a shows an association relationship between two types of random access resources and downlink synchronization signals. FIG. 6a shows four downlink synchronization signals and four first-type random access resources (an RACH 1, an RACH 2, an RACH 3, and an RACH 4). The four downlink synchronization signals are sent by using beams 1 to 4 respectively. A first downlink synchronization signal is corresponding to the first first-type random access resource RACH 1. A second downlink synchronization signal is corresponding to the second first-type random access resource RACH 2. A third downlink synchronization signal is corresponding to the third first-type random access resource RACH 3. A fourth downlink synchronization signal is corresponding to the fourth first-type random access resource RACH 4. FIG. 6a further shows a second-type random access resource RACH 5. It can be learned from FIG. 6a that the second-type random access resource RACH 5 is not associated with the downlink synchronization signals.

In an implementation, a system parameter (Numerology) of the first-type random access resource is different from a system parameter of the second-type random access resource, and the system parameter includes a subcarrier spacing and a symbol length.

In step S501a, the configuration means determining which resources are used as first-type random access resources and which resources are used as second-type random access resources.

Specifically, the random access resource includes at least one of a time-frequency resource, a sequence resource, and a cyclic shift resource that are used to send a random access preamble.

Step S502a: The base station sends downlink signals on different resources by using a plurality of directional beams.

The downlink signals include but are not limited to a downlink synchronization signal, a system message, and a downlink measurement pilot signal. In this embodiment of the present invention, downlink signals sent by using different beams are referred to as different downlink signals.

The resources in step S502a may be frequency resources. The downlink signals are sent on different frequency bands by using the different directional beams. For example, a downlink signal is sent on a frequency band A by using a beam 1, and a downlink signal is sent on a frequency band B by using a beam 2. Alternatively, the resources in step S502a may be time resources, and the downlink signals are sent in different time periods by using the different directional beams.

Optionally, step S502a may include sending, by the base station, X first signals and Y second signals, where each of the Y second signals is used to indicate random access configuration information. The random access configuration information includes first-type random access configuration information and second-type random access configuration information, the first-type random access configuration information is used to indicate Z first-type random access resources and a correspondence between the Z first-type random access resources and resources of the X first signals, and the second-type random access information is used to indicate the second-type random access resource.

The first signal is at least one of a downlink synchronization signal, a broadcast signal, or a downlink measurement pilot signal. The second signal is a broadcast signal or a system message. X, Y, and Z are positive integers. X, Y, and Z are all greater than 1. It should be noted that, in actual application, usually, X=Y=Z, and X is equal to a quantity of directional beams used by the base station.

In an implementation, the first-type random resource configuration information in each second signal includes a correspondence between all first signals configured for a cell to which the second signal belongs and the first-type random access resources. Alternatively, in another implementation, the first-type random access configuration information in each second signal includes a correspondence between a subset of all first signals configured for a cell to which the second signal belongs and a subset of the first-type random access resources.

Further, first signals in a same subset are sent within a same time unit, and the time unit is a subframe, a slot, or a mini-slot. Because the first signals are sent through beam sweeping, sending beams of the first signals sent within the same time unit are relatively close.

In this way, the terminal may store a correspondence between a first signal and a first-type random access resource only once or several times, and subsequently, directly search the stored correspondence for a first-type random access resource corresponding to a resource of a currently received first signal.

In another implementation, the first-type random access configuration information in each second signal may alternatively include configuration information only of a first-type random access resource corresponding to a directional beam that is corresponding to the second signal, so that the terminal sends a random access preamble by using a first-type random access resource corresponding to a second signal that is found by the terminal through detection.

In this implementation, the first-type random access configuration information is used to indicate first-type random access resources corresponding to a plurality of directional beams, and a correspondence between the first-type random access resources corresponding to the plurality of directional beams and the resources of the X first signals, so that the terminal may select a beam with relatively good signal quality to send the random access preamble.

In another implementation, the first-type random access configuration information corresponding to each second signal may include only a first-type random access resource corresponding to a directional beam that is corresponding to the second signal, so that the terminal sends a random access preamble by using a first-type random access resource corresponding to a second signal that is found by the terminal through detection.

In an implementation, a resource of the first signal may be a code resource (such as a downlink synchronization signal sequence or a broadcast signal scrambling code), or may be a time-domain resource, or may be a frequency-domain resource.

Further, the correspondence between the Z first-type random access resources and the resources of the X first channels/signals includes each of the Z first-type random access resources is corresponding to one of different sequences of X downlink synchronization signals. Or the correspondence between the Z first-type random access resources and the resources of the X first channels/signals includes each of the Z first-type random access resources is corresponding to one of different time-domain resources of X downlink synchronization signals. Or the correspondence between the Z first-type random access resources and the resources of the X first channels/signals includes each of the Z first-type random access resources is corresponding to one of different frequency-domain resources of X downlink synchronization signals. Or the correspondence between the Z first-type random access resources and the resources of the X first channels/signals includes each of the Z first-type random access resources is corresponding to one of different sequences of X downlink measurement pilot signals. Or the correspondence between the Z first-type random access resources and the resources of the X first channels/signals includes each of the Z first-type random access resources is corresponding to one of different time-domain resources of X downlink measurement pilot signals. Or the correspondence between the Z first-type random access resources and the resources of the X first channels/signals includes each of the Z first-type random access resources is corresponding to one of different frequency-domain resources of X downlink measurement pilot signals. Or the correspondence between the Z first-type random access resources and the resources of the X first channels/signals includes each of the Z first-type random access resources is corresponding to one of different scrambling codes of X broadcast signals. Or the correspondence between the Z first-type random access resources and the resources of the X first channels/signals includes each of the Z first-type random access resources is corresponding to one of different time-domain resources of X broadcast signals. Or the correspondence between the Z first-type random access resources and the resources of the X first channels/signals includes each of the Z first-type random access resources is corresponding to one of different frequency-domain resources of X broadcast signals.

Optionally, a resource of each second signal in the resources of the Y second signals is corresponding to the resources of the X first signals, so that the terminal may determine a corresponding resource of a second signal based on a resource of a first signal.

Step S503a: The terminal receives a downlink synchronization signal, and performs downlink synchronization with the base station by using the downlink synchronization signal.

The downlink synchronization includes time synchronization and frequency synchronization. The downlink synchronization may prepare for subsequent receiving on a broadcast channel.

Step S504a: The terminal receives a second signal sent by the base station.

As described in step S502a, the second signal is a broadcast signal or a system message. After achieving the downlink synchronization, the terminal may receive the broadcast signal or the system message sent by the base station.

In an implementation, a second signal carrying the first-type random access configuration information and a second signal carrying the second-type random access configuration information are a same signal.

In another implementation, a second signal carrying the first-type random access configuration information and a second signal carrying the second-type random access configuration information are different signals, and the second signal carrying the second-type random access configuration information is sent before the second signal carrying the first-type random access configuration information, so that the terminal can implement quick access.

In actual application, if the second signal carrying the first-type random access configuration information and the second signal carrying the second-type random access configuration information are different signals, there may be the following implementations. The second signal carrying the second-type random access configuration information is a signal on a PBCH, and the second signal carrying the first-type random access configuration information is an essential system information block (essential System Information Block 1, essential SIB for short), also referred to as remaining system information (Remaining System Information, RMSI for short). Or the second signal carrying the second-type random access configuration information is a signal on a PBCH, and the second signal carrying the first-type random access configuration information is a system information block 1 (System Information Block 1, SIB1 for short). Or the second signal carrying the second-type random access configuration information is an essential SIB, and the second signal carrying the first-type random access configuration information is an SIB1.

The essential SIB includes information used for initial access.

Step S505a: The terminal determines a first-type random access resource corresponding to the downlink synchronization signal.

In this embodiment, the terminal determines the first-type random access resource corresponding to the downlink synchronization signal, based on the Z first-type random access resources in the second signal and the correspondence that is in the second signal and that is between the Z first-type random access resources and the resources of the X first signals.

Step S506a: The terminal sends a random access preamble by using the first-type random access resource or a second-type random access resource.

When the terminal is the terminal in the scenario shown in FIG. 2a or FIG. 2b, the terminal may send the random access preamble by using the second-type random access resource. In another case, the terminal may send the random access preamble by using the first-type random access resource.

Specifically, step S506a may be implemented in the following manners:

the terminal may send the random access preamble on each of the first-type random access resource and the second-type random access resource, so as to improve a probability of receiving the random access preamble by the base station; or the terminal may detect a moving speed of the terminal, and if the terminal finds, through detection, that the moving speed of the terminal exceeds a preset value, send the random access preamble by using the second-type random access resource; or if the terminal finds, through detection, that the moving speed of the terminal does not exceed a specified value, send the random access preamble by using the first-type random access resource.

The detection performed by the terminal on the moving speed of the terminal may be implemented, for example, by performing detection on a Doppler frequency shift, or may be implemented by using another existing technology. This is not limited in this application.

Step S507a: The base station receives the random access preamble that is sent by the terminal by using the first-type random access resource or the second-type random access resource.

Optionally, step S507a may include receiving, by using a single beam, the random access preamble that is sent by the terminal on the first-type random access resource. Alternately receiving, by using a plurality of beams, the random access preamble that is sent by the terminal on the second-type random access resource.

Preferably, in this embodiment, different types of random access resources are further corresponding to random access preamble formats. Specifically, the first-type random access resource is corresponding to a first-type random access preamble format, and the second-type random access resource is corresponding to a second-type random access preamble format. The first-type random access preamble format includes a cyclic prefix part and a preamble sequence part, and the preamble sequence part of the first-type random access preamble format includes a single sequence. The second-type random access preamble format includes a cyclic prefix part and a preamble sequence part, and the preamble sequence part of the second-type random access preamble format includes a plurality of repeated sequences.

Figure 7A:
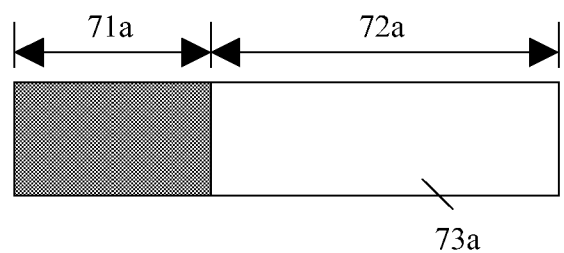
FIG. 7a is a schematic diagram of a first-type random access preamble format according to an embodiment of the present invention.
Figure 7B:
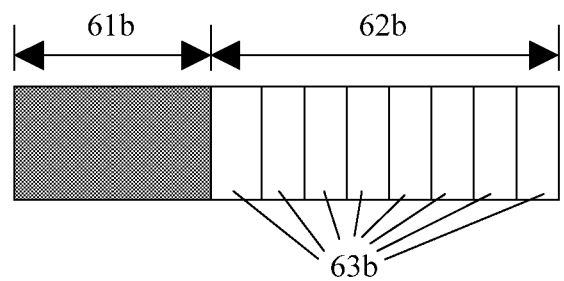
FIG. 7b is a schematic diagram of a second-type random access preamble format according to an embodiment of the present invention.

The first-type random access preamble format is shown in FIG. 7a, and the second-type random access preamble format is shown in FIG. 7b. As shown in FIG. 7a, the first-type random access preamble format includes the cyclic prefix part 71a and the preamble sequence part 72a, and the preamble sequence part of the first-type random access preamble format includes the single sequence 73a. As shown in FIG. 7b, the second-type random access preamble format also includes the cyclic prefix part 71b and the preamble sequence part 72b, and the preamble sequence part 72b of the second-type random access preamble format includes the plurality of repeated sequences 73b. It can be learned from FIG. 7a and FIG. 7b that a length of the single sequence 73a in the first-type random access preamble format may be greater than a length of the single sequence 73b in the second-type random access preamble format.

When the terminal sends, on the second-type random access resource, a random access preamble in the second-type random access preamble format, each directional beam of the base station may be used to detect one of the plurality of repeated sequences, so as to completely receive the random access preamble sent by the terminal.

It should be noted that, in the embodiment shown in FIG. 5a, the terminal determines the first-type random access resource corresponding to the downlink signal based on the Z first-type random access resources in the second signal and the correspondence that is in the second signal and that is between the Z first-type random access resources and the resources of the X first signals. In another embodiment, the terminal may alternatively determine the first-type random access resource corresponding to the downlink signal based on a preset correspondence between the downlink signal and the first-type random access resource. For example, a location relationship between a time-frequency resource of the downlink signal and the first-type random access resource may be set by default, and the terminal may directly determine, based on the location relationship, the first-type random access resource corresponding to the downlink signal. In this case, the second signal does not need to indicate the first-type random access configuration information.

Optionally, the method may further include the following step.

Step S508a: The base station sends a random access answer to the terminal, where the random access answer includes indication information used to indicate an optimal directional beam of the terminal.

Specifically, the first-type random access resource is in a one-to-one correspondence with a first-type random access answer resource, K second-type random access resources are corresponding to one second-type random access answer resource, and K is an integer greater than 1. Preferably, every K consecutive second-type random access resources are corresponding to one second-type random access answer resource.

FIG. 5b shows another random access method according to an embodiment of the present invention. The method is implemented by using the system shown in FIG. 1, and is applicable to the scenarios shown in FIG. 2a and FIG. 2b. In the embodiment shown in FIG. 5b, the method includes the following steps.

Step S501b: A base station configures at least two types of random access resources.

In this embodiment, the at least two types of random access resources include a first-type random access resource and a second-type random access resource. The first-type random access resource is associated with resources of different downlink signals in a first association manner, and the second-type random access resource is associated with the resources of the different downlink signals in a second association manner, where the first association manner is different from the second association manner. The first-type random access resource is associated with the resources of the different downlink signals, the second-type random access resource is also associated with the resources of the different downlink signals, and a manner of associating the first-type random access resource with the resources of the different downlink signals is different from a manner of associating the second-type random access resource with the resources of the different downlink signals.

The first-type random access resource may include one or more random access resources, and the second-type random access resource may include one or more random access resources. Each random access resource includes at least one of a time-frequency resource, a sequence resource, and a cyclic shift resource.

The downlink signal in step S501b may be a downlink synchronization signal, a broadcast signal, or a downlink measurement pilot signal. Different downlink signals are sent by using different beams.

Specifically, the first association manner includes: time-frequency resources of at least two first-type random access resources corresponding to different downlink signals are different; and the second association manner includes: time-frequency resources of at least two second-type random access resources corresponding to different downlink signals are the same, but sequence resources of the at least two second-type random access resources corresponding to the different downlink signals are different. The following describes in detail an association relationship between a random access resource and a resource of a downlink signal by using an example in which both the first-type random access resource and the second-type random access resource are associated with resources of different downlink synchronization signals.

Figure 6B:
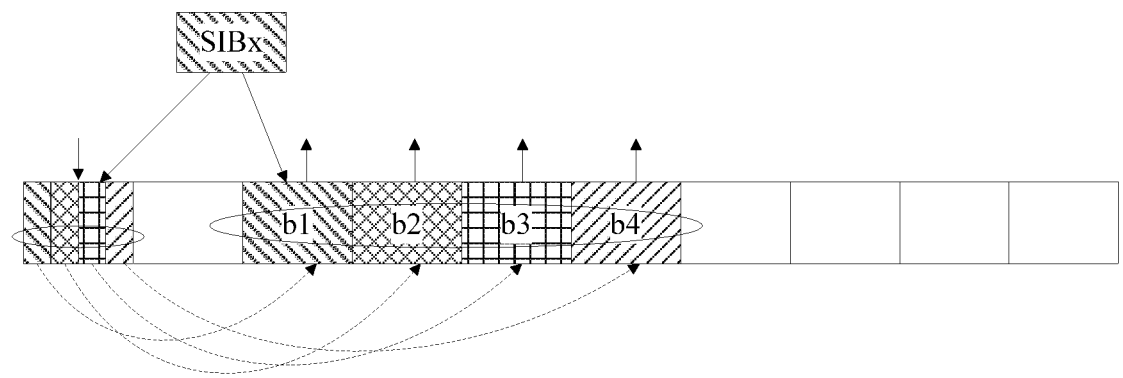
FIG. 6b shows another association relationship between first-type random access resources and downlink synchronization signals.

FIG. 6b shows an association relationship between a first-type random access resource and a downlink synchronization signal. FIG. 6b shows four downlink synchronization signals and time-frequency resources (b1, b2, b3, and b4) of four first-type random access resources. The four downlink synchronization signals are sent by using beams 1 to 4 respectively. A first downlink synchronization signal is corresponding to the time-frequency resource b1 of a first first-type random access resource. A second downlink synchronization signal is corresponding to the time-frequency resource b2 of a second first-type random access resource. A third downlink synchronization signal is corresponding to the time-frequency resource b3 of a third first-type random access resource. A fourth downlink synchronization signal is corresponding to the time-frequency resource b4 of a fourth first-type random access resource.

Figure 6C:
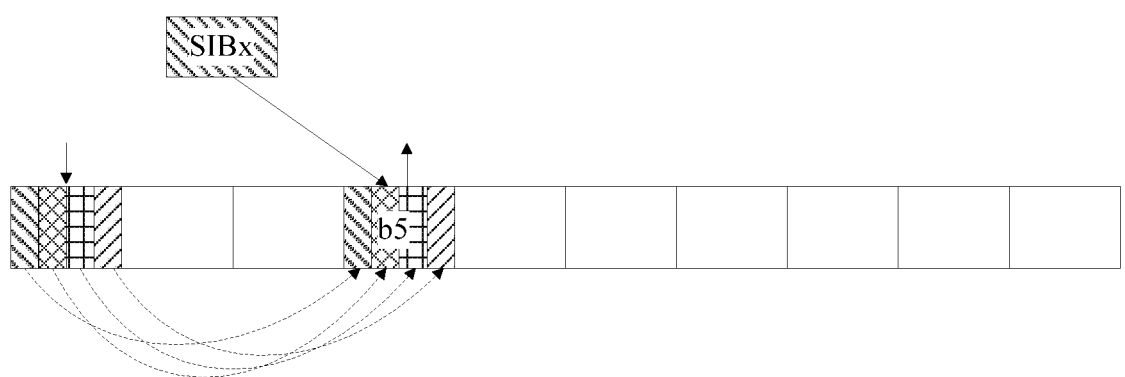
FIG. 6c shows another association relationship between first/second-type random access resources and downlink synchronization signals.

FIG. 6c shows an association relationship between a second-type random access resource and a downlink synchronization signal. FIG. 6c shows four downlink synchronization signals, and the four downlink synchronization signals are the same as the four downlink synchronization signals in FIG. 6b. In FIG. 6c, time-frequency resources of four second-type random access resources are the same. To be specific, the time-frequency resource b5 is corresponding to four sequence resources, and the four sequence resources are respectively corresponding to resources of the four downlink synchronization signals.

In FIG. 6b and FIG. 6c, a downward arrow indicates a sending beam of the base station, and an upward arrow indicates a receiving beam of the base station.

In an implementation, a system parameter (Numerology) of the first-type random access resource is different from a system parameter of the second-type random access resource, and the system parameter includes a subcarrier spacing and a symbol length.

Step S502b: The base station sends downlink signals on different resources by using a plurality of directional beams.

In step S502b, the downlink signals sent by the base station include but are not limited to a downlink synchronization signal, a broadcast signal, or a downlink measurement pilot signal. It is easily figured out that the base station periodically sends these downlink signals. In each period, the base station first sends a downlink synchronization signal, and then sends a system message (or a broadcast signal) and a downlink measurement pilot signal.

The resources in step S502b may be frequency resources. The downlink signals are sent on different frequency bands by using the different directional beams. For example, a downlink signal is sent on a frequency band A by using a beam 1, and a downlink signal is sent on a frequency band B by using a beam 2. Alternatively, the resources in step S502b may be time resources, and the downlink signals are sent in different time periods by using the different directional beams.

Optionally, step S502b may include: sending, by the base station, X first signals and Y second signals. Each of the Y second signals is used to indicate random access configuration information. The random access configuration information in the second signal includes at least one of first-type random access configuration information and second-type random access configuration information, the first-type random access configuration information is used to indicate Z first-type random access resources and a correspondence between the Z first-type random access resources and resources of the X first signals, and the second-type random access information is used to indicate the second-type random access resource, or the second-type random access configuration information is used to indicate Z second-type random access resources and a correspondence between the Z second-type random access resources and resources of the X first signals.

The first signal is at least one of a downlink synchronization signal, a broadcast signal, or a downlink measurement pilot signal. The second signal is a broadcast signal or a system message. X, Y, and Z are positive integers. X, Y, and Z are all greater than 1.

It should be noted that, in actual application, usually, X=Y=Z, and X is equal to a quantity of directional beams used by the base station.

In an implementation, the first-type random resource configuration information in each second signal includes a correspondence between all first signals configured for a cell to which the second signal belongs and the first-type random access resources. Alternatively, in another implementation, the first-type random access configuration information in each second signal includes a correspondence between a subset of all first signals configured for a cell to which the second signal belongs and a subset of the first-type random access resources.

Further, first signals in a same subset are sent within a same time unit, and the time unit is a subframe, a slot, or a mini-slot (mini-slot). Because the first signals are sent through beam sweeping, directions of sending beams of the first signals sent within the same time unit are relatively close.

In this way, the terminal may store a correspondence between a first signal and a first-type random access resource only once or several times (corresponding to a quantity of subsets), and subsequently, directly search the stored correspondence for a first-type random access resource corresponding to a resource of a currently received first signal.

In another implementation, the first-type random access configuration information in each second signal may alternatively include configuration information only of a first-type random access resource corresponding to a directional beam that is corresponding to the second signal, so that the terminal sends a random access preamble by using a first-type random access resource corresponding to a second signal that is found by the terminal through detection.

In an implementation, a resource of the first signal may be a code resource (such as a downlink synchronization signal sequence or a broadcast signal scrambling code), or may be a time-domain resource, or may be a frequency-domain resource.

The correspondence between the Z first-type random access resources and the resources of the X first signals includes: each of the Z first-type random access resources is corresponding to one of different resources of X downlink signals.

For example, the correspondence between the Z first-type random access resources and the resources of the X first signals includes each of the Z first-type random access resources is corresponding to one of different sequences of X downlink synchronization signals. Or the correspondence between the Z first-type random access resources and the resources of the X first signals includes each of the Z first-type random access resources is corresponding to one of different time-domain resources of X downlink synchronization signals. Or the correspondence between the Z first-type random access resources and the resources of the X first signals includes each of the Z first-type random access resources is corresponding to one of different frequency-domain resources of X downlink synchronization signals. Or the correspondence between the Z first-type random access resources and the resources of the X first signals includes each of the Z first-type random access resources is corresponding to one of different sequences of X downlink measurement pilot signals. Or the correspondence between the Z first-type random access resources and the resources of the X first signals includes each of the Z first-type random access resources is corresponding to one of different time-domain resources of X downlink measurement pilot signals. Or the correspondence between the Z first-type random access resources and the resources of the X first signals includes each of the Z first-type random access resources is corresponding to one of different frequency-domain resources of X downlink measurement pilot signals. Or the correspondence between the Z first-type random access resources and the resources of the X first signals includes each of the Z first-type random access resources is corresponding to one of different scrambling codes of X broadcast signals. Or the correspondence between the Z first-type random access resources and the resources of the X first signals includes each of the Z first-type random access resources is corresponding to one of different time-domain resources of X broadcast signals. Or the correspondence between the Z first-type random access resources and the resources of the X first signals includes each of the Z first-type random access resources is corresponding to one of different frequency-domain resources of X broadcast signals.

The correspondence between the Z second-type random access resources and the resources of the X first signals includes: each of the Z second-type random access resources is corresponding to one of different resources of X downlink signals. For a specific manner, refer to the manner in which the first-type random access resources are corresponding to the different resources of the X downlink signals. Detailed descriptions are omitted herein.

Optionally, a resource of each second signal in the resources of the Y second signals is corresponding to the resources of the X first signals, so that the terminal may determine a corresponding resource of a second signal based on a resource of a first signal.

Further, a direction of a sending beam of a first signal is the same as a direction of a sending beam of a second signal whose resource is corresponding to that of the first signal.

Step S503b: The terminal receives a downlink synchronization signal, and performs downlink synchronization with the base station by using the downlink synchronization signal.

Step S504b: The terminal receives a second signal sent by the base station.

As described in step S502b, the second signal is a broadcast signal or a system message. After achieving the downlink synchronization, the terminal may receive the broadcast signal or the system message sent by the base station.

In an implementation, a second signal carrying the first-type random access configuration information and a second signal carrying the second-type random access configuration information are a same signal.

In another implementation, a second signal carrying the first-type random access configuration information and a second signal carrying the second-type random access configuration information are different signals, and the second signal carrying the second-type random access configuration information is sent before the second signal carrying the first-type random access configuration information, so that the terminal can implement quick access.

In actual application, if the second signal carrying the first-type random access configuration information and the second signal carrying the second-type random access configuration information are different signals, there may be the following implementations. The second signal carrying the second-type random access configuration information is a signal on a PBCH, and the second signal carrying the first-type random access configuration information is an essential system information block (essential System Information Block 1, essential SIB for short). Or the second signal carrying the second-type random access configuration information is a signal on a PBCH, and the second signal carrying the first-type random access configuration information is a system information block 1 (System Information Block 1, SIB1 for short). Or the second signal carrying the second-type random access configuration information is an essential SIB, and the second signal carrying the first-type random access configuration information is an SIB1.

The essential SIB includes information used for initial access.

Step S505b: The terminal determines a first-type random access resource corresponding to the downlink synchronization signal.

In this embodiment, the terminal determines the first-type random access resource corresponding to the downlink synchronization signal, based on the Z first-type random access resources in the second signal and the correspondence that is in the second signal and that is between the Z first-type random access resources and the resources of the X first signals.

Step S506b: The terminal sends a random access preamble by using the first-type random access resource or a second-type random access resource.

For a specific implementation of step S506b, refer to step S506a. Detailed descriptions are omitted herein.

Step S507b: The base station receives the random access preamble that is sent by the terminal by using the first-type random access resource or the second-type random access resource.

The X first signals are sent by using different beams. In step S507b, the base station receives, by using a receiving beam in a same direction as a sending beam of a first signal, a random access preamble that is sent by using a random access resource (the first-type random access resource or the second-type random access resource) corresponding to a resource of the first signal.

For related content of step S507b, refer to step S507a. Detailed descriptions are omitted herein.

Step S508b: The base station sends a random access answer to the terminal, where the random access answer includes indication information used to indicate an optimal directional beam of the terminal.

Specifically, the first-type random access resource is in a one-to-one correspondence with a first-type random access answer resource, K second-type random access resources are corresponding to one second-type random access answer resource, and K is an integer greater than 1. Preferably, every K consecutive second-type random access resources are corresponding to one second-type random access answer resource.

It should be noted that this application is described by using an example in which the first signal is a downlink synchronization signal. In another embodiment, the first signal may alternatively be another downlink signal, such as a measurement pilot signal and a broadcast signal.

FIG. 8 shows another random access method according to an embodiment of the present invention. The method is implemented by using the system shown in FIG. 1, and is applicable to the scenario shown in FIG. 2c. As shown in FIG. 8, the method includes the following steps.

Step S801: A base station configures at least two types of random access resources.

The at least two types of random access resources include a first-type random access resource and a second-type random access resource. Different types of random access resources are corresponding to different sending beam forms of a terminal. In this embodiment, a sending beam form of the terminal corresponding to the first-type random access resource is an omnidirectional beam, and a sending beam form of the terminal corresponding to the second-type random access resource is a plurality of directional beams.

The first-type random access resource may include one or more resources, and the second-type random access resource may include one or more resources.

In step S801, the configuration means determining which resources are used as first-type random access resources and which resources are used as second-type random access resources.

Specifically, the random access resource includes at least one of a time-frequency resource, a sequence resource, and a cyclic shift resource that are used to send a random access preamble.

Step S802: The base station sends downlink signals on different resources by using a plurality of directional beams.

For a specific implementation of step S802, refer to step S502. Details are not described herein again.

Step S803: The terminal receives a downlink signal sent by the base station.

As shown in FIG. 2c, the terminal receives a downlink signal sent by using the beam 3.

Step S804: The terminal measures reference signal received power, and if the RSRP is greater than a specified threshold, performs step S805, or if the RSRP is less than or equal to a specified threshold, performs step S806.

If the RSRP is greater than the specified threshold, it indicates that the terminal is located in a central area of a cell; or if the RSRP is less than or equal to the specified threshold, it indicates that the terminal is located in an edge area of a cell.

Step S805: The terminal sends a random access preamble on a first-type random access resource by using an omnidirectional beam.

Figure 9A:
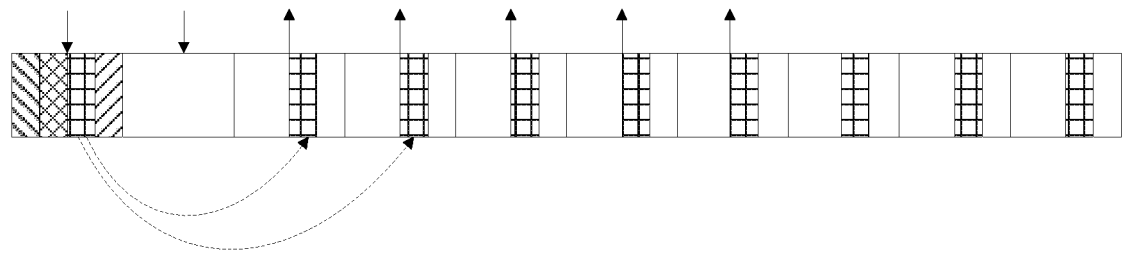
FIG. 9a is a schematic diagram of a relationship between a downlink signal and a first-type random access resource used by a terminal.

As shown in FIG. 9a, because the terminal receives the downlink signal sent by the base station by using the directional beam 3, the terminal may send the random access preamble by using a first-type random access resource corresponding to the downlink signal.

In step S805, because the terminal is located in the central area of the cell, the terminal may select the omnidirectional beam whose beam gain is less than that of a directional beam, to send the random access preamble. This can ensure that the base station can receive the random access preamble sent by the terminal, and meet a coverage requirement.

Step S806: The terminal sends a random access preamble on a second-type random access resource by using a plurality of directional beams.

A quantity of directional beams used by the terminal may be corresponding to different random preamble sequence groups. A correspondence between a quantity of directional beams and a random preamble sequence group may be preconfigured. For example, when the quantity of directional beams used by the terminal is 2, available random preamble sequences are sequences 1 to 10; when the quantity of directional beams used by the terminal is 3, available random preamble sequences are sequences 11 to 20; and so on.

Further, in step S806, the terminal may perform polling on K directional beams on K second-type random access resources by using same transmit power, where K is an integer greater than 1, so that the base station determines an optimal sending beam of the terminal based on a received signal.

Optionally, after step S806, the method may further include the following step:

Step S807: The base station receives the random access preamble sent by the terminal.

Optionally, after step S807, the method may further include step S808: The terminal receives a random access answer sent by the base station, where the random access answer includes indication information used to indicate an optimal sending beam of the terminal.

Optionally, after step S806, the method may further include after the terminal sends the random access preamble by performing polling on the K directional beams on the K second-type random access resources by using the same transmit power, if the terminal receives no random access answer, increasing the transmit power, and then re-sending the random access preamble by performing polling on the K directional beams on the K random access resources by using same transmit power, where K is an integer greater than 1.

Figure 9B:
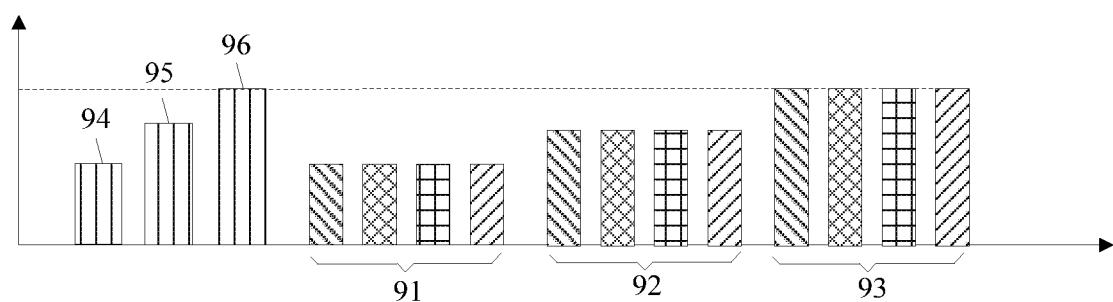
FIG. 9b shows transmit power used by a terminal to send a random access preamble by using two sending beam forms.

As shown in FIG. 9b, at a first stage 91, the terminal first sends the random access preamble by performing polling on the K directional beams on the K second-type random access resources by using first transmit power. The terminal receives no random access answer sent by the base station, and therefore the terminal increases the transmit power at a second stage 92, and sends the random access preamble by performing polling on the K directional beams on the K second-type random access resources by using second transmit power. Afterward, the terminal still receives no random access answer sent by the base station, and therefore the terminal increases the transmit power again at a third stage 93, and sends the random access preamble by performing polling on the K directional beams on the K second-type random access resources by using third transmit power. It is easily figured out that a quantity, allowed for the terminal, of times of increasing the transmit power may be preconfigured.

Specifically, K second-type random access resources are corresponding to one second-type random access answer resource, and K is an integer greater than 1. Preferably, every K consecutive second-type random access resources are corresponding to one second-type random access answer resource. As shown in FIG. 9b, after sending the random access preamble on four second-type random access resources by using directional beams, the terminal may detect for a random access answer on one second-type random access answer resource corresponding to the four second-type random access resources, and if no random access answer is found through detection, may increase transmit power.

Specifically, the first-type random access resource is in a one-to-one correspondence with a first-type random access answer resource. As shown in FIG. 9b, after sending the random access preamble on one first-type random access resource by using an omnidirectional beam and fourth transmit power 94, the terminal detects for a random access answer on a first-type random access answer resource corresponding to the first-type random access resource; if no random access answer is found through detection, the terminal may increase the transmit power of the omnidirectional beam, re-send the random access preamble on the first-type random access resource by using the omnidirectional beam and fifth transmit power 95, and then detect for a random access answer on the first-type random access answer resource corresponding to the first-type random access resource; and if still no random access answer is found through detection, the terminal may increase the transmit power of the omnidirectional beam, re-send the random access preamble on the first-type random access resource by using the omnidirectional beam and sixth transmit power 96, and then detect for a random access answer on the first-type random access answer resource corresponding to the first-type random access resource. It is easily figured out that a quantity, allowed for the terminal, of times of increasing the transmit power may be preconfigured.

Preferably, the first-type random access resource is corresponding to a first-type random access preamble format, the second-type random access resource is corresponding to a second-type random access preamble format, the first-type random access preamble format and the second-type random access preamble format each include a cyclic prefix part and a preamble sequence part, and the preamble sequence part includes a single sequence. A length of a single sequence in the first-type random access preamble format is greater than a length of a single sequence in the second-type random access preamble format.

It should be noted that, in actual application, the solution described in the embodiment shown in FIG. 5a or FIG. 5b may be used in combination with the solution described in the embodiment shown in FIG. 6, that is, the base station may configure four types of random access resources.

Figure 10:
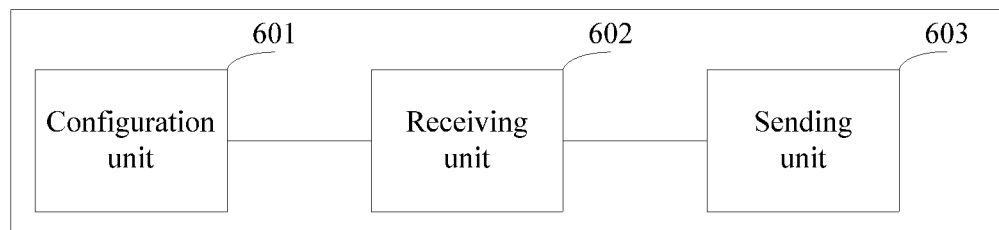
FIG. 10 is a schematic structural diagram of a random access apparatus according to an embodiment of the present invention.

As shown in FIG. 10, an embodiment of the present invention provides a random access apparatus. The apparatus may be implemented as all or a part of a base station by using software, hardware, or a combination thereof. The apparatus includes a configuration unit 601 and 604 and a receiving unit 602.

The configuration unit 601 is configured to configure at least two types of random access resources. The at least two types of random access resources include a first-type random access resource and a second-type random access resource. Different types of random access resources are in a one-to-one correspondence with different sending beam forms of a terminal; or the first-type random access resource is associated with resources of different downlink signals, and the second-type random access resource is not associated with the resources of the different downlink signals; or the first-type random access resource is associated with resources of different downlink signals in a first association manner, and the second-type random access resource is associated with the resources of the different downlink signals in a second association manner, where the first association manner is different from the second association manner.

The receiving unit 602 is configured to receive a random access preamble that is sent by the terminal by using the first-type random access resource or the second-type random access resource.

Optionally, the apparatus further includes a sending unit 603. The sending unit 603 is configured to send X first signals and Y second signals, where each of the Y second signals includes at least one of random access configuration information. The random access configuration information in each second signal includes at least one of first-type random access configuration information and second-type random access configuration information, the first-type random access configuration information is used to indicate Z first-type random access resources and a correspondence between the Z first-type random access resources and resources of the X first signals, and the second-type random access information is used to indicate the second-type random access resource, or the second-type random access information is used to indicate Z second-type random access resources and a correspondence between the Z second-type random access resources and the resources of the X first signals.

The first signal is at least one of a downlink synchronization signal, a broadcast signal, or a downlink measurement pilot signal. The second signal is a broadcast signal or a system message. X, Y, and Z are positive integers. X, Y, and Z are all greater than 1.

In an implementation of this embodiment of the present invention, the receiving unit 602 may be configured to receive, by using a single beam, the random access preamble that is sent by the terminal on the first-type random access resource. Or the receiving unit 602 may be configured to alternately receive, by using a plurality of beams, the random access preamble that is sent by the terminal on the second-type random access resource.

Optionally, the apparatus further includes: the sending unit 603, configured to send a random access answer to the terminal, where the random access answer includes indication information used to indicate an optimal directional beam of the terminal.

In this embodiment of the present invention, the first-type random access resource is in a one-to-one correspondence with a first-type random access answer resource. K second-type random access resources are corresponding to one second-type random access answer resource. K is an integer greater than 1.

In this embodiment of the present invention, every K consecutive second-type random access resources are corresponding to one second-type random access answer resource.

For related details, refer to the method embodiment in FIG. 5a, FIG. 5b, or FIG. 8.

It should be noted that the sending unit 603 may be implemented by a transmitter, or a processor in cooperation with a transmitter; the receiving unit 602 may be implemented by a receiver Rx, or a processor in cooperation with a receiver; and the configuration unit 601 may be implemented by a processor, or a processor executing a program instruction in a memory.

Figure 11:
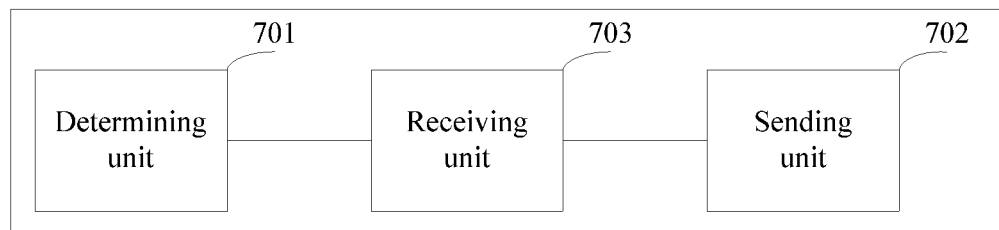
FIG. 11 is a schematic structural diagram of another random access apparatus according to an embodiment of the present invention.

Referring to FIG. 11, an embodiment of the present invention provides a random access apparatus. The apparatus may be implemented as all or a part of a terminal by using software, hardware, or a combination thereof. The apparatus includes a determining unit 701 and a sending unit 702.

The determining unit 701 is configured to determine at least two types of random access resources. The at least two types of random access resources include a first-type random access resource and a second-type random access resource. Different types of random access resources are in a one-to-one correspondence with different sending beam forms of the terminal; or the first-type random access resource is associated with resources of different downlink signals, and the second-type random access resource is not associated with the resources of the different downlink signals; or the first-type random access resource is associated with resources of different downlink signals in a first association manner, and the second-type random access resource is associated with the resources of the different downlink signals in a second association manner, where the first association manner is different from the second association manner.

The sending unit 702 is configured to send a random access preamble by using the first-type random access resource or the second-type random access resource.

Optionally, the apparatus further includes a receiving unit 703, configured to receive first signals and second signals that are sent by a base station, where each of the second signals includes random access configuration information, the random access configuration information in each second signal includes at least one of first-type random access configuration information and second-type random access configuration information, the first-type random access configuration information is used to indicate Z first-type random access resources and a correspondence between the Z first-type random access resources and resources of the X first signals, and the second-type random access information is used to indicate the second-type random access resource, or the second-type random access configuration information is used to indicate Z second-type random access resources and a correspondence between the Z second-type random access resources and the resources of the X first signals.

The first signal is at least one of a downlink synchronization signal, a broadcast signal, or a downlink measurement pilot signal. The second signal is a broadcast signal or a system message. X, Y, and Z are positive integers. X, Y, and Z are all greater than 1.

In an implementation of this embodiment of the present invention, the sending unit 702 may be configured to when reference signal received power obtained by the terminal through measurement is greater than a specified threshold, send the random access preamble by selecting the first-type random access resource and by using an omnidirectional beam. Or when reference signal received power obtained by the terminal through measurement is less than or equal to a specified threshold, send the random access preamble by selecting the second-type random access resource and by using a plurality of directional beams.

In this embodiment of the present invention, a quantity of directional beams used by the terminal is corresponding to different random preamble sequence groups.

Optionally, the apparatus further includes the receiving unit 703, configured to receive a random access answer sent by the base station, where the random access answer includes indication information used to indicate an optimal sending beam of the terminal.

Optionally, the sending unit 702 is further configured to send the random access preamble by performing polling on K directional beams on K second-type random access resources by using same transmit power.

Further, the sending unit 702 is further configured to after the terminal sends the random access preamble by performing polling on the K directional beams on the K second-type random access resources by using the same transmit power, if the terminal receives no random access answer, increase the transmit power, and then re-send the random access preamble by performing polling on the K directional beams on the K random access resources by using same transmit power, where K is an integer greater than 1.

In this embodiment of the present invention, the first-type random access resource is in a one-to-one correspondence with a first-type random access answer resource. K second-type random access resources are corresponding to one second-type random access answer resource. K is an integer greater than 1.

In this embodiment of the present invention, every K consecutive second-type random access resources are corresponding to one second-type random access answer resource.

For related details, refer to the method embodiment in FIG. 5a, FIG. 5b, or FIG. 8.

It should be noted that the sending unit 702 may be implemented by a transmitter, or a processor in cooperation with a transmitter; the receiving unit 703 may be implemented by a receiver Rx, or a processor in cooperation with a receiver; and the determining unit 701 may be implemented by a processor, or a processor executing a program instruction in a memory.

It should be noted that, when the random access apparatus provided in the foregoing embodiments performs random access, division of the foregoing functional units is merely used as an example for description. In actual application, the foregoing functions may be allocated to different function modules for implementation, depending on a requirement. To be specific, an internal information structure of the apparatus and the system is divided into different function modules to implement all or some of the functions described above. In addition, the random access apparatus and the random access system provided in the foregoing embodiments and the random access method embodiments belong to a same idea. For details about a specific implementation process of the random access apparatus and the random access system, refer to the method embodiments. Details are not described herein again.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An apparatus, comprising:
a receiver, configured to receive a system information block 1 (SIB1) from a base station, wherein the SIB1 indicates random access resources and a correspondence between the random access resources and resources of a plurality of downlink signals, the random access resources comprising a first-type random access resource and a second-type random access resource; and
a transmitter, configured to send a random access preamble to the base station using the first-type random access resource;
wherein the first-type random access resource is associated with resources of at least one downlink signal, of the plurality of downlink signals, satisfying the correspondence, and the second-type random access resource is not associated with the resources of the downlink signals satisfying the correspondence; and
wherein the at least one downlink signal satisfying the correspondence comprises X different downlink signals, the first-type random access resource comprises Z different first-type random access resources, and the X different downlink signals correspond to time-frequency resources of the Z different first-type random access resources.

2. The apparatus according to claim 1, wherein a downlink signal of the plurality of downlink signals comprises at least one of a downlink synchronization signal, a broadcast signal, or a downlink measurement pilot signal.

3. The system according to claim 1, wherein:
the second-type random access resource comprises Y different second-type random access resources; and
the X different downlink signals correspond to sequence resources of the Y different second-type random access resources.

4. An apparatus, comprising:
a transmitter, configured to send a system information block 1 (SIB1) to a terminal, wherein the SIB1 indicates random access resources and a correspondence between the random access resources and resources of a plurality of downlink signals, the random access resources comprising a first-type random access resource and a second-type random access resource; and
a receiver, configured to receive a random access preamble from the terminal, using the first-type random access resource;
wherein the first-type random access resource is associated with resources of at least one downlink signal, of the plurality of downlink signals, satisfying the correspondence, and the second-type random access resource is not associated with the resources of the at least one downlink signal satisfying the correspondence; and
wherein the at least one downlink signal satisfying the correspondence comprises X different downlink signals, the first-type random access resource comprises Z different first-type random access resources, and the X different downlink signals correspond to time-frequency resources of the Z different first-type random access resources.

5. The apparatus according to claim 4, wherein a downlink signal of the plurality of downlink signals comprises at least one of a downlink synchronization signal, a broadcast signal, or a downlink measurement pilot signal.

6. The system according to claim 4, wherein:
the second-type random access resource comprises Y different second-type random access resources; and
the X different downlink signals correspond to sequence resources of the Y different second-type random access resources.

7. A system, comprising a base station and a terminal, wherein:
the base station is configured to send a system information block 1 (SIB1) to the terminal, wherein the SIB1 indicates random access resources and a correspondence between the random access resources and resources of a plurality of downlink signals, the random access resources comprising a first-type random access resource and a second-type random access resource; and
the terminal is configured to send a random access preamble to the base station using the first-type random access resource;
wherein the first-type random access resource is associated with resources of at least one downlink signal, of the plurality of downlink signals, satisfying the correspondence, and the second-type random access resource is not associated with the resources of the at least one downlink signals satisfying the correspondence; and
wherein the at least one downlink signal satisfying the correspondence comprises X different downlink signals, the first-type random access resource comprises Z different first-type random access resources, and the X different downlink signals correspond to time-frequency resources of the Z different first-type random access resources.

8. The system according to claim 7, wherein a downlink signal of the plurality of downlink signals comprises at least one of a downlink synchronization signal, a broadcast signal, or a downlink measurement pilot signal.

9. The system according to claim 7, wherein:
the second-type random access resource comprises Y different second-type random access resources; and
the X different downlink signals correspond to sequence resources of the Y different second-type random access resources.

10. An apparatus, comprising:
a receiver, configured to receive a system information block 1 (SIB1) from a base station, wherein the SIBi indicates random access resources and a correspondence between the random access resources and resources of a plurality of downlink signals, the correspondence comprising at least one of a first-type correspondence and a second-type correspondence; and
a transmitter, configured to send a random access preamble to the base station using a first-type random access resource satisfying the first-type correspondence, or a second-type random access resource satisfying the second-type correspondence; and
wherein the at least one downlink signal, of the plurality of downlink signals, satisfies the correspondence between the random access resources and resources of a plurality of downlink signals, the at least one downlink signal satisfying the correspondence comprises X different downlink signals, the first-type random access resource comprises Z different first-type random access resources, and the X different downlink signals correspond to time-frequency resources of the Z different first-type random access resources.

11. The apparatus according to claim 10, wherein:
the second-type random access resource comprises Y different second-type random access resources; and
the X different downlink signals correspond to sequence resources of the Y different second-type random access resources.

12. The apparatus according to claim 10, wherein a downlink signal of the plurality of downlink signals comprises at least one of a downlink synchronization signal, a broadcast signal, or a downlink measurement pilot signal.

13. An apparatus, comprising:
a transmitter, configured to send a system information block 1 (SIB1) to a terminal, wherein the SIB1 indicates random access resources and a correspondence between the random access resources and resources of a plurality of downlink signals, the correspondence comprising at least one of a first-type correspondence and a second-type correspondence; and
a receiver, configured to receive a random access preamble from the terminal using a first-type random access resource satisfying the first-type correspondence. or a second-type random access resource satisfying the second-type correspondence; and
wherein the at least one downlink signal, of the plurality of downlink signals, satisfies the correspondence between the random access resources and resources of a plurality of downlink signals, the at least one downlink signal satisfying the correspondence comprises X different downlink signals, the first-type random access resource comprises Z different first-type random access resources, and the X different downlink signals correspond to time-frequency resources of the Z different first-type random access resources.

14. The apparatus according to claim 13, wherein:
the second-type random access resource comprises Y different second-type random access resources; and
the X different downlink signals correspond to sequence resources of the Y different second-type random access resources.

15. The apparatus according to claim 13, wherein a downlink signal of the plurality of downlink signals comprises at least one of a downlink synchronization signal, a broadcast signal, or a downlink measurement pilot signal.

16. A system, comprising a base station and a terminal, wherein:
the base station is configured to send a system information block 1 (SIB1) to the terminal, wherein the SIB1 indicates random access resources and a correspondence between the random access resources and resources of a plurality of downlink signals, the correspondence comprising at least one of a first-type correspondence and a second-type correspondence; and
the terminal is configured to send a random access preamble to the base station using a first-type random access resource satisfying the first-type correspondence, or a second-type random access resource satisfying the second-type correspondence; and
wherein at least one downlink signal, of the plurality of downlink signals, satisfies the correspondence between the random access resources and resources of a plurality of downlink signals, the at least one downlink signal satisfying the correspondence comprises X different downlink signals, the first-type random access resource comprises Z different first-type random access resources, and the X different downlink signals correspond to time-frequency resources of the Z different first-type random access resources.

17. The system according to claim 16, wherein:
the second-type random access resource comprises Y different second-type random access resources; and
the X different downlink signals correspond to sequence resources of the Y different second-type random access resources.

18. The system according to claim 16, wherein a downlink signal of the plurality of downlink signals comprises at least one of a downlink synchronization signal, a broadcast signal, or a downlink measurement pilot signal.

* * * * *

UNITED STATES PATENT AND TRADEMARK OFFICE
CERTIFICATE OF CORRECTION

PATENT NO. : 11,382,135 B2
APPLICATION NO. : 16/272705
DATED : July 5, 2022
INVENTOR(S) : Kunpeng Liu It is certified that error appears in the above-identified patent and that said Letters Patent is hereby corrected as shown below:

In the Claims

Claim 10, Column 32, Line 50; delete "SIBi" and insert --SIB1--.

Claim 10, Column 32, Line 61; delete "wherein the at least" and insert --wherein at least--.

Claim 13, Column 33, Line 27; delete "wherein the at least" and insert --wherein at least--.

Signed and Sealed this
Ninth Day of August, 2022

Katherine Kelly Vidal
*Director of the United States Patent and Trademark Office*